United States Patent
Secatch et al.

(10) Patent No.: US 12,086,455 B2
(45) Date of Patent: Sep. 10, 2024

(54) DATA STORAGE SYSTEM WITH WORKLOAD-BASED ASYMMETRY COMPENSATION

(71) Applicant: Seagate Technology LLC, Fremont, CA (US)

(72) Inventors: Stacey Secatch, Niwot, CO (US); David W. Claude, Loveland, CO (US); Daniel J. Benjamin, Savage, MN (US); Thomas V. Spencer, Ft. Collins, CO (US); Matthew B. Lovell, Longmont, CO (US); Steven Williams, Longmont, CO (US); Stephen H. Perlmutter, Louisville, CO (US)

(73) Assignee: Seagate Technology LLC, Fremont, CA (US)

( * ) Notice: Subject to any disclaimer, the term of this patent is extended or adjusted under 35 U.S.C. 154(b) by 53 days.

(21) Appl. No.: 17/497,573

(22) Filed: Oct. 8, 2021

(65) Prior Publication Data
US 2022/0113898 A1    Apr. 14, 2022

Related U.S. Application Data

(60) Provisional application No. 63/198,282, filed on Oct. 8, 2020.

(51) Int. Cl.
*G06F 3/06*    (2006.01)
(52) U.S. Cl.
CPC .......... *G06F 3/0655* (2013.01); *G06F 3/0604* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 10,310,873 B1* | 6/2019 | DeRosa | G06F 3/067 |
| 11,586,385 B1* | 2/2023 | Lercari | G06F 12/0246 |
| 2012/0179846 A1* | 7/2012 | Haustein | G06F 3/0689 |
| | | | 710/38 |
| 2015/0255147 A1* | 9/2015 | Lin | G06F 12/0238 |
| | | | 365/189.05 |
| 2017/0212692 A1* | 7/2017 | Camp | G06F 3/0611 |
| 2018/0321860 A1* | 11/2018 | Marchenko | G06F 11/3433 |
| 2018/0335976 A1* | 11/2018 | DeRosa | G06F 3/0611 |
| 2019/0101880 A1* | 4/2019 | Guim Bernat | G06F 12/0238 |
| 2019/0303008 A1* | 10/2019 | Bennett | G06F 11/1068 |
| 2020/0012452 A1* | 1/2020 | Bannur Subraya | G06F 3/0611 |
| 2020/0174705 A1* | 6/2020 | Qawami | G06F 3/0604 |
| 2020/0183592 A1* | 6/2020 | Lim | G11C 29/52 |
| 2022/0083273 A1* | 3/2022 | Saito | G06F 3/0688 |
| 2022/0091763 A1* | 3/2022 | Perneti | G06F 3/0653 |

* cited by examiner

*Primary Examiner* — Stephanie Wu
(74) *Attorney, Agent, or Firm* — Hall Estill Law Firm

(57) ABSTRACT

A data storage system may have a plurality of memory cells located in different data storage devices that are arranged into a plurality of logical namespaces with each logical namespace configured to be sequentially written and entirely erased as a single unit. An asymmetry strategy may be proactively created with the asymmetry module in response to data access activity to the logical namespaces by the asymmetry module. A new mode, as prescribed by the asymmetry strategy, is entered for at least one logical namespace in response to an operational trigger being met. The new mode changes a timing of at least one queued data access request to at least one logical namespace.

20 Claims, 9 Drawing Sheets

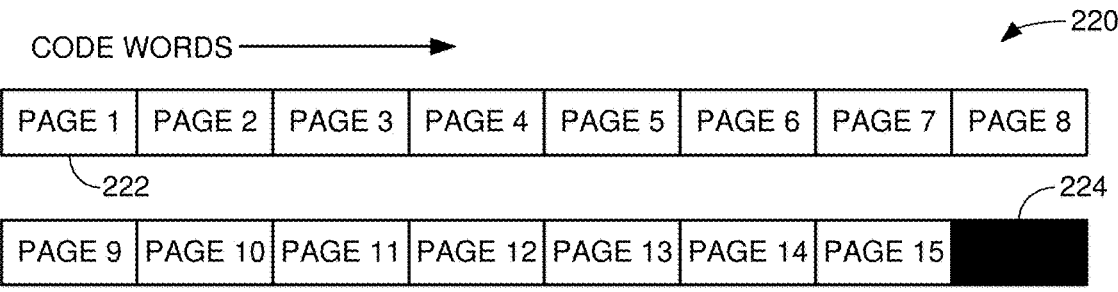
FIG. 8
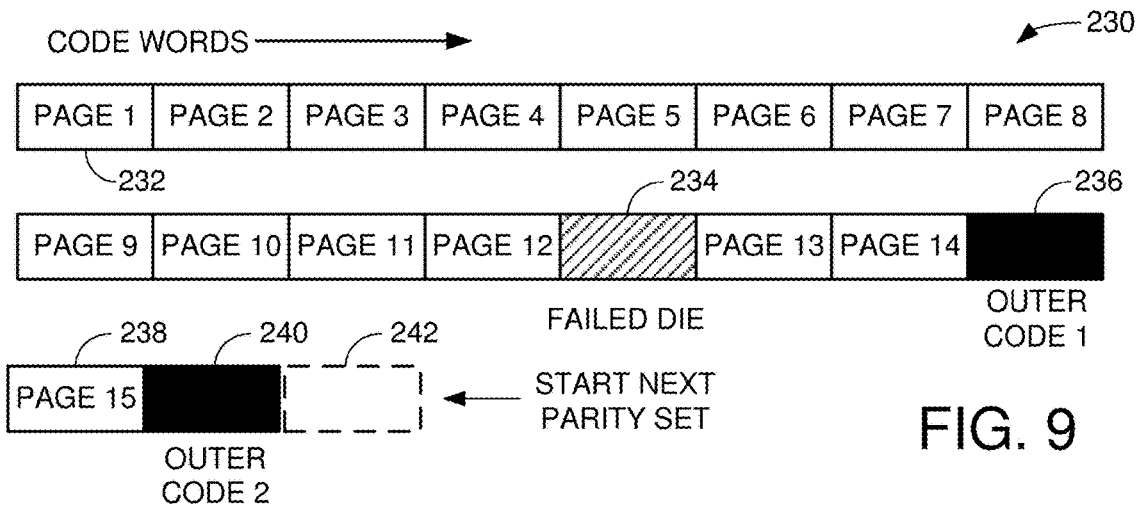
FIG. 9
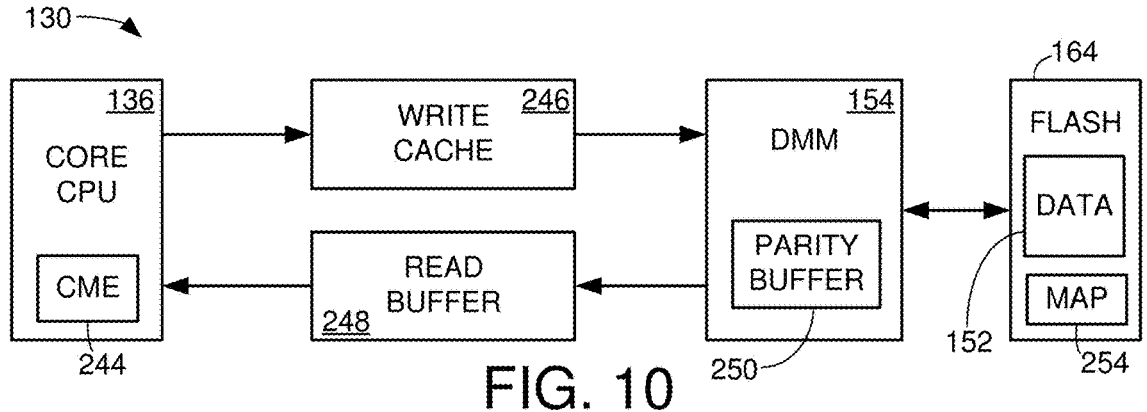
FIG. 10
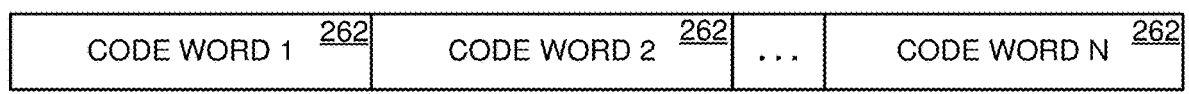
FIG. 11

DATA STORAGE SYSTEM WITH WORKLOAD-BASED ASYMMETRY COMPENSATION

SUMMARY

Various embodiments of the present disclosure are generally directed to the workload-based asymmetry compensation in a memory, such as, but not limited to, a flash memory in a solid state drive (SSD).

Various embodiments configure a data storage system with a plurality of memory cells located in different data storage devices into a plurality of logical namespaces that are each sequentially written and entirely erased as a single unit. A workload strategy is generated with an asymmetry module connected to the plurality of logical namespaces with the workload strategy having at least one operational trigger. An asymmetry strategy and a channel strategy are proactively created with the asymmetry module in response to data access activity to the plurality of logical namespaces. The asymmetry module predicts the at least one operational trigger being reached by at least one logical namespace and chooses a preexisting strategy to execute with the asymmetry module in response to the prediction of at least one operational trigger being met. Execution of the strategy performs one or more operational alterations to an existing policy for at least one logical namespace as prescribed by the chosen strategy to reduce an asymmetry between a length of time a data read operation takes to complete to a namespace of the plurality of namespaces compared to a length of time a data write operation takes to complete to a namespace of the plurality of namespaces.

In accordance with other embodiments, a plurality of memory cells located in different data storage devices are arranged into a plurality of logical namespaces with each logical namespace being sequentially written and entirely erased as a single unit. A workload strategy is generated with an asymmetry module connected to the plurality of logical namespaces with the workload strategy having at least one operational trigger. The asymmetry module proceeds to rank at least two of the plurality of logical namespaces according to a risk of asymmetry between a length of time a data read operation takes to complete to a namespace of the plurality of namespaces compared to a length of time a data write operation takes to complete to a logical namespace. One or more operational alterations are then conducted to an existing policy, with the asymmetry module, for a top ranked logical namespace in accordance with a strategy generated by the asymmetry strategy. The one or more operational alterations are prescribed to reduce read/write asymmetry to the top ranked logical namespace.

A data storage system, in some embodiments, has a plurality of memory cells located in different data storage devices that are arranged into a plurality of logical namespaces with each logical namespace configured to be sequentially written and entirely erased as a single unit. An asymmetry strategy is proactively created with the asymmetry module in response to data access activity to the logical namespaces by the asymmetry module. A new mode, as prescribed by the asymmetry strategy, is entered for at least one logical namespace in response to an operational trigger being met. The new mode changes a timing of at least one queued data access request to at least one logical namespace

BRIEF DESCRIPTION OF THE DRAWINGS

FIG. 8 illustrates an example data set that can be written to the data storage device of FIG. 1 in accordance with assorted embodiments.

FIG. 9 is an example non-standard data set that may occur in the data storage device of FIG. 1 in accordance with various embodiments.

FIG. 10 shows a functional block representation of an example data storage device configured in accordance with some embodiments.

FIG. 11 displays a block representation of portions of an example data storage device arranged in accordance with assorted embodiments.

DETAILED DESCRIPTION

Figure 1:
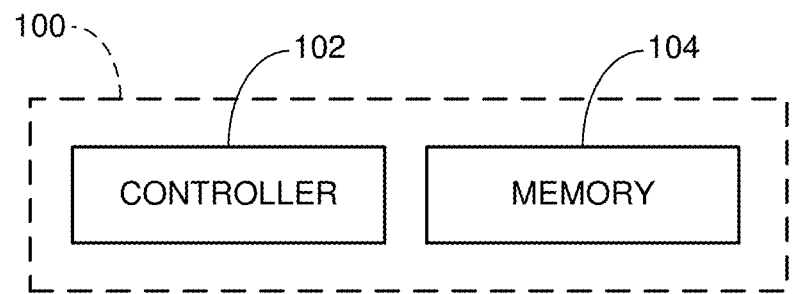
FIG. 1 provides a functional block representation of a data storage device in accordance with various embodiments.

Assorted embodiments discussed herein, without limitation, are directed to a data storage system that compute workloads to logical namespaces of memory cells and adjust operational policy to minimize read/write asymmetry and optimize the utilization of the logical namespaces.

Solid state drives (SSDs) are data storage devices that store user data in non-volatile memory (NVM) made up of an array of solid-state semiconductor memory cells. SSDs usually have an NVM module and a controller. The controller controls the transfer of data between the NVM and a host device. The NVM will usually be NAND flash memory, but other forms of solid-state memory can be used.

A flash memory module may be arranged as a series of dies. A die represents a separate, physical block of semiconductor memory cells. The controller communicates with the dies using a number of channels, or lanes, with each channel connected to a different subset of the dies. Any respective numbers of channels and dies can be used. Groups of dies may be arranged into NVMe sets in accordance with the NVMe (Non-Volatile Memory Express) Standard. This standard enables multiple owners (users) to access and control separate portions of a given SSD (or other memory device).

Metadata is often generated and used to describe and control the data stored to an SSD. The metadata may take the form of one or more map structures that track the locations of data blocks written to various GCUs (garbage collection units), which are sets of erasure blocks that are erased and allocated as a unit. The map structures can include a forward map and a reverse directory, although other forms can be used.

The forward map provides an overall map structure that can be accessed by a controller to service a received host access command (e.g., a write command, a read command, etc.). The forward map may take the form of a two-level map, where a first level of the map maintains the locations of map pages and a second level of the map provides a flash transition layer (FTL) to provide association of logical addresses of the data blocks to physical addresses at which the blocks are stored. Other forms of maps can be used including single level maps and three-or-more level maps, but each generally provides a forward map structure in which pointers may be used to point to each successive block until the most current version is located.

The reverse directory can be written to the various GCUs and provides local data identifying, by logical address, which data blocks are stored in the associated GCU. The reverse directory, also sometimes referred to as a footer, thus provides a physical to logical association for the locally stored blocks. As with the forward map, the reverse directory can take any number of suitable forms. Reverse directories are particularly useful during garbage collection operations, since a reverse directory can be used to determine which data blocks are still current and should be relocated before the associated erasure blocks in the GCU are erased.

SSDs expend a significant amount of resources on maintaining accurate and up-to-date map structures. Nevertheless, it is possible from time to time to have a mismatch between the forward map and the reverse directory for a given GCU. These situations are usually noted at the time of garbage collection. For example, the forward map may indicate that there are X valid data blocks in a given erasure block (EB), but the reverse directory identifies a different number Y valid blocks in the EB. When this type of mismatch occurs, the garbage collection operation may be rescheduled or may take a longer period of time to complete while the system obtains a correct count before proceeding with the recycling operation.

The NVMe specification provides that a storage device should have the ability to provide guaranteed levels of deterministic performance for specified periods of time (deterministic windows, or DWs). To the extent that a garbage collection operation is scheduled during a DW, it is desirable to ensure that the actual time that the garbage collection operation would require to complete is an accurate estimate in order for the system to decide whether and when to carry out the GC operation.

SSDs include a top level controller circuit and a flash (or other semiconductor) memory module. A number of channels, or lanes, are provided to enable communications between the controller and dies within the flash memory. The dies are further subdivided into planes, GCUs, erasure blocks, pages, etc. Groups of dies may be arranged into separate NVMe sets, or namespaces. This allows the various NVMe sets to be concurrently serviced for different owners (users).

In one nonlimiting example, a 4 TB SSD has 128 die connected using 8 channels so that 16 die are connected to each channel. Each die has two planes that support concurrent read or write operations to the same page number (but not necessarily the same erasure blocks, EBs). GCUs nominally are formed using one EB from each of 32 dies. Each page stores 16K of data plus LDPC inner code values. GCU writes are thus formed by writing (nominally) 31 pages of user data, and one page of parity (XOR) data. This will support a loss of a single die. EBs represent the smallest increment of memory that can be erased as a unit, but in practice, garbage collection takes place at the GCU level.

Flash devices can be noisy and thus it is common to write data in the form of code words to individual pages of data. A page may store 16K worth of user payload data, plus some additional number of LDPC (low density parity check) codes, which may be on the order of an additional 5K or so bits. The number and strength of the LDPC codes are used to enable, normally, correct reading back of the payload. Outercode, or parity values, can additionally be written as noted above to correct read errors when the inner code values are insufficient to resolve the error.

Despite the ability to correct errors, the efficient utilization of memory in a solid-state data storage device remains important. With some solid-state memories having a finite lifespan tied to a number of read, write, and erase cycles, such as flash memory, the efficient utilization of memory cells is even more important. The logical division of memory into namespaces has allows object storage that is less rigid than physical division of memory, such as by device, die, plane, page, block, or range of physical block addresses (PBA). The use of namespaces can allow for increased controller customization of where data can be stored, and retrieved. However, simple logical namespaces can generate increased volumes of system processing that can degrade data storage performance.

The evolution of logical memory namespaces has progressed to having zoned namespaces where portions of memory are associated with sequential data writing and collaboration of local memory and host controller for data placement. The use of zoned namespaces can increase data storage efficiency by reducing write amplification, data over-provisioning, and volatile data buffer space consumed during the storage, and retrieval, of data in a memory. Zoned namespaces can be customized to provide increased write performance through streams, but zoned namespaces suffer from inconsistency and unreliability, particularly when a memory employs multiple physically separate die of memory cells, that is compounded by increasing pressure for data storage devices to provide consistent data access performance for data writes and data reads.

Accordingly, various embodiments of a data storage system employ an asymmetry module to determine the real-time workload for various logical namespaces and dynamically adapt operational policy to minimize read/write asymmetry. By intelligently altering namespace data access policy based on the workload to a namespace, data accesses can be handled in a customized manner to the volume of work/performance experienced and/or expected for a namespace. The ability to execute a variety of different predetermined namespace operational policy changes in response to detected, or predicted, namespace workload results in efficient and accurate correction, and prevention, of differences in data read and data write performance.

With these goals in mind, namespaces can be optimized at least for read/write asymmetry by an asymmetry module that generates one or more strategies that assign namespace policy alterations to accommodate a variety of different workloads with minimal data access latency difference between data reads and data writes. The asymmetry module can intelligently detect workloads and execute one or more reactive, and/or proactive, namespace operational policy changes that adjust for variances in memory cell structural operation, channel function, and pending data access requests to maintain data access performance and minimal asymmetry despite evolving namespace workloads. Hence, the customization of data access policy for a namespace in response to actual detected namespace workloads ensure that system resources, such as processing, channel, and buffers, are utilized intelligently to provide reliable quality of service without increasing the asymmetry between data reads and data writes.

These and other features may be practiced in a variety of different data storage devices, but various embodiments conduct wear range optimization in the example data storage device 100 shown as a simplified block representation in FIG. 1. The device 100 has a controller 102 and a memory module 104. The controller block 102 represents a hardware-based and/or programmable processor-based circuit configured to provide top level communication and control functions. The memory module 104 includes solid state non-volatile memory (NVM) for the storage of user data from one or more host devices 106, such as other data storage devices, network server, network node, or remote controller.

Figure 2:
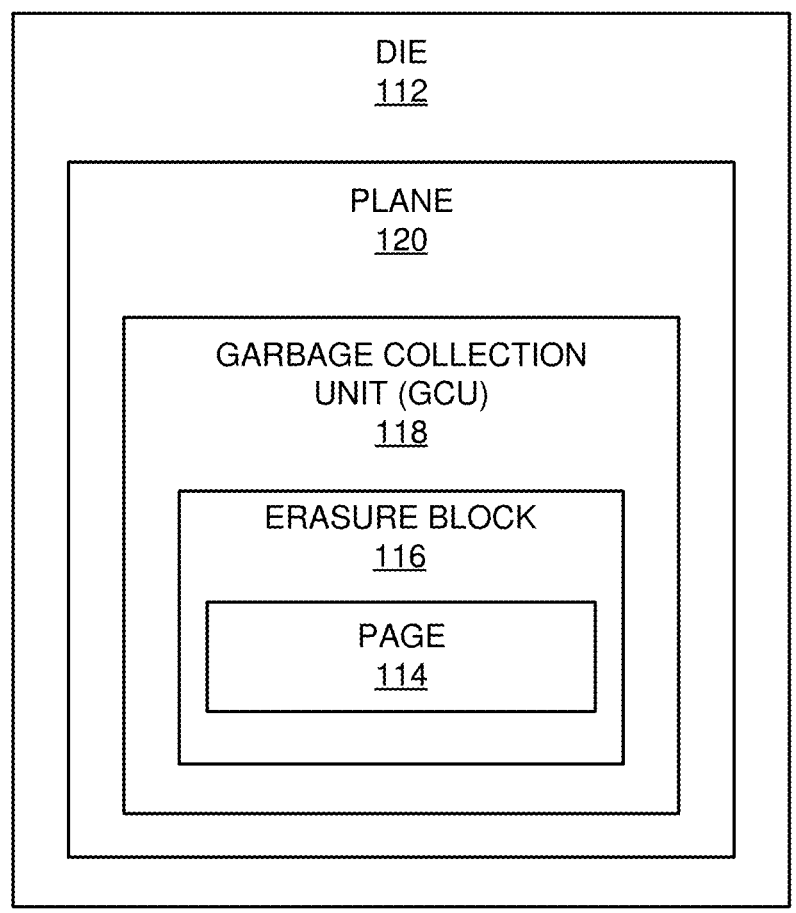
FIG. 2 shows aspects of the device of FIG. 1 characterized as a solid state drive (SSD) in accordance with some embodiments.

FIG. 2 shows a block representation of portions of an example memory 110 arranged in accordance with some embodiments. A memory die 112 can be configured with any solid-state memory cells, such as flash, resistive, phase change, and spin-torque memory, without limitation. The smallest unit of memory that can be accessed at a time is referred to as a page 114. A page 114 may be formed using a number of solid-state memory cells that share a common word line, bit line, or source line. The storage size of a page 114 can vary; current generation flash memory pages can store, in some cases, 16 KB (16,384 bytes) of user data.

A number of pages are integrated into an erasure block 116, which represents the smallest grouping of memory cells that can be concurrently erased in a NAND flash memory. A number of erasure blocks 116 can be arranged into a garbage collection unit (GCU) 118, which may utilize erasure blocks across different dies 112, as explained below. GCUs 118 can be allocated for the storage of data. Once a sufficient amount of the stored data is determined to be stale (e.g., no longer the most current version), a garbage collection operation can be carried out to recycle the GCU 118. This includes identifying and relocating the current version data to a new location, followed by an erasure operation to reset the memory cells. The GCU 118 may then be returned to an allocation pool for subsequent allocation to begin storing new user data.

Each die 112 may include a plurality of planes 120. Examples include two planes per die, four planes per die, etc. although other arrangements can be used. Generally, a plane is a subdivision of the die 112 arranged with separate read/write/erase circuitry such that a given type of access operation (such as a write operation, etc.) can be carried out simultaneously by each of the planes to a common page address within the respective planes.

Figure 3:
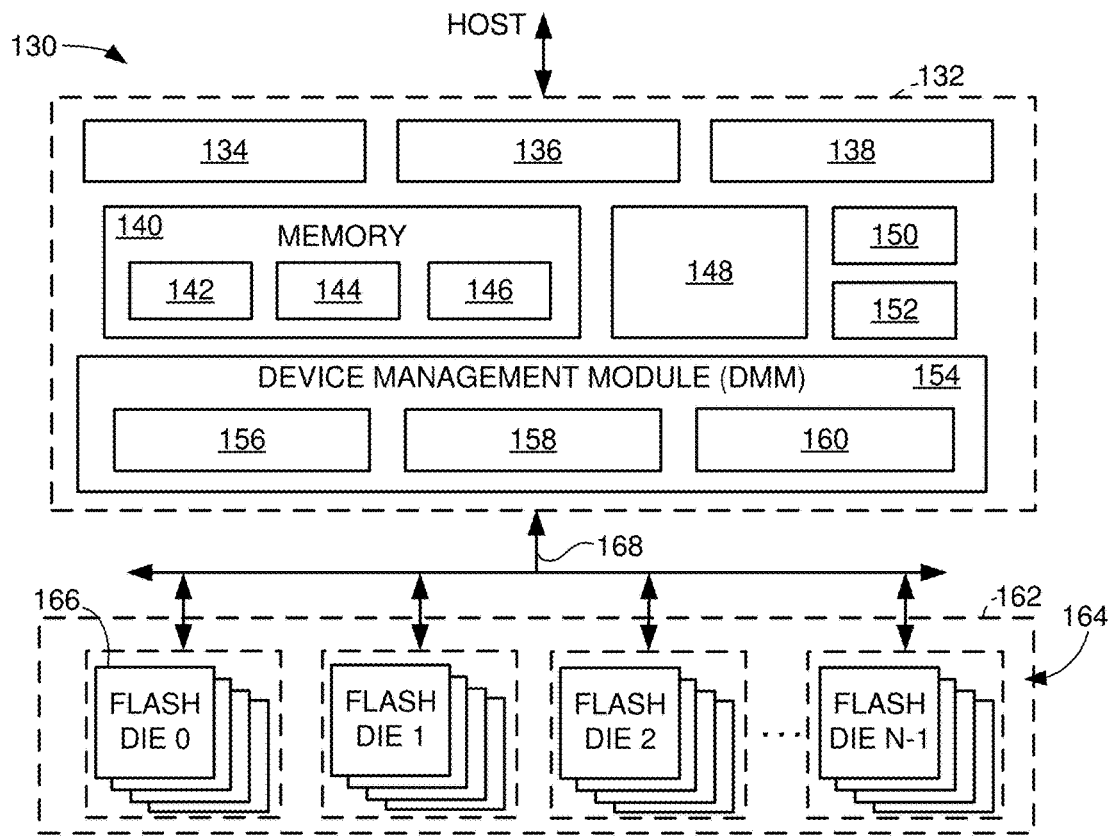
FIG. 3 shows an arrangement of the flash memory of FIG. 2 in some embodiments.

FIG. 3 depicts portions of an example data storage device 130 generally corresponding to the device 100 in FIG. 1. The device 130 is configured as a solid state drive (SSD) that communicates with one or more host devices via one or more Peripheral Component Interface Express (PCIe) ports, although other configurations can be used. The NVM is contemplated as comprising NAND flash memory, although other forms of solid state non-volatile memory carp be used.

In at least some embodiments, the SSD operates in accordance with the NVMe (Non-Volatile Memory Express) Standard, which enables different users to allocate NVMe sets (die sets) for use in the storage of data. Each NVMe set may form a portion of an NVMe Namespace that may span multiple SSDs or be contained within a single SSD.

The SSD 130 includes a controller circuit 132 with a front end controller 134, a core controller 136 and a back end controller 138. The front end controller 134 performs host I/F functions, the back end controller 138 directs data transfers with the memory module 134 and the core controller 136 provides top level control for the device.

Each controller 134, 136 and 138 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 140 represents various forms of volatile and/or non-volatile memory (e.g., SRAM, DDR DRAM, flash, etc.) utilized as local memory by the controller 132. Various data structures and data sets may be stored by the memory including one or more map structures 142, one or more caches 144 for map data and other control information, and one or more data buffers 146 for the temporary storage of host (user) data during data transfers.

A non-processor based hardware assist circuit 148 may enable the offloading of certain memory management tasks by one or more of the controllers as required. The hardware circuit 148 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 132, such as a data compression block 150 and an encryption block 152. The data compression block 150 applies lossless data compression to input data sets during write operations, and subsequently provides data de-compression during read operations. The encryption block 152 provides any number of cryptographic functions to input data including encryption, hashes, decompression, etc.

A device management module (DMM) 154 supports back end processing operations and may include an outer code engine circuit 156 to generate outer code, a device I/F logic circuit 158 and a low density parity check (LDPC) circuit 160 configured to generate LDPC codes as part of the error detection and correction strategy used to protect the data stored by the by the SSD 130.

A memory module 162 corresponds to the memory 104 in FIG. 1 and includes a non-volatile memory (NVM) in the form of a flash memory 164 distributed across a plural number N of flash memory dies 166. Rudimentary flash memory control electronics (not separately shown in FIG. 3) may be provisioned on each die 166 to facilitate parallel data transfer operations via one or more channels (lanes) 168.

Figure 4:
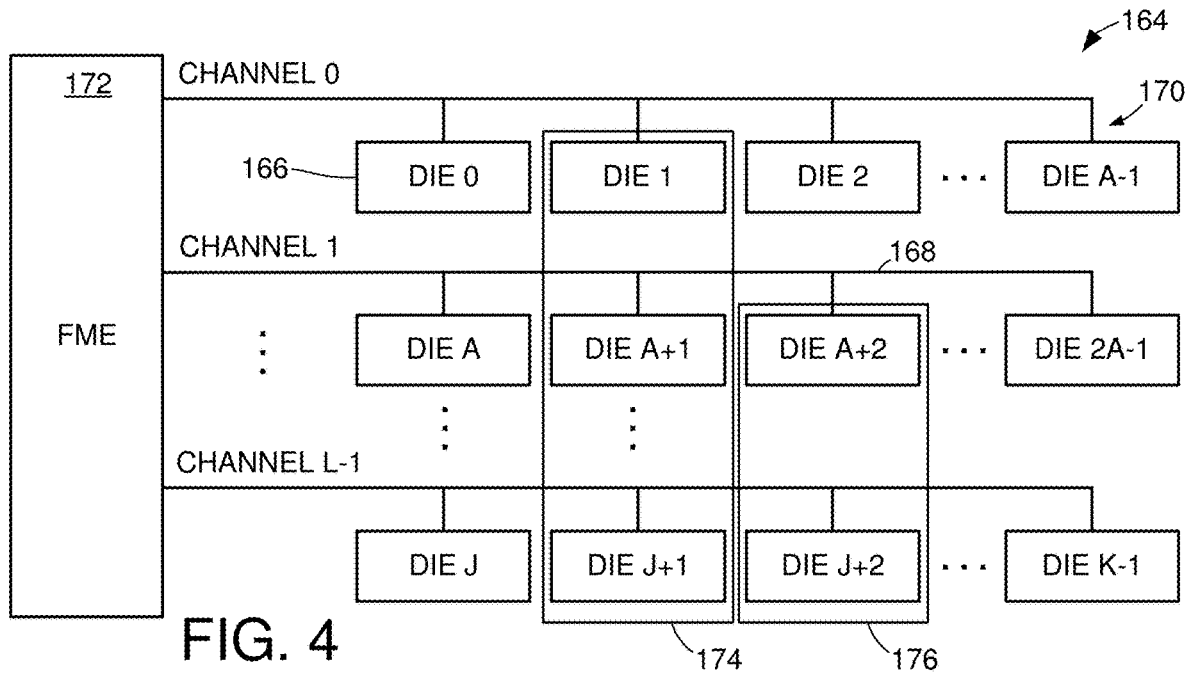
FIG. 4 illustrates the use of channels to access the dies in FIG. 3 in some embodiments.

FIG. 4 shows further aspects of the flash memory 164 arranged in accordance with some embodiments. A total number K dies 166 are provided and arranged into physical die groups 170. Each die group 170 is connected to a separate channel 168 using a total number of L channels. In one example, K is set to 128 dies, L is set to 8 channels, and each physical die group has 16 dies. As noted above, a single die within each physical die group can be accessed at a time using the associated channel. A flash memory electronics (FME) circuit 172 of the flash memory 164 controls each of the channels 168 to transfer data to and from the dies 166.

In some embodiments, the various dies are arranged into one or more NVMe sets. An NVMe set represents a portion of the storage capacity of the SSD that is allocated for use by a particular host (user/owner). NVMe sets are usually established with a granularity at the die level, so that some percentage of the total available dies 166 will be allocated for incorporation into a given NVMe set.

A first example NVMe set is denoted at 174 in FIG. 4. This first set 174 uses a single die 166 from each of the different channels 168. This arrangement provides fast performance during the servicing of data transfer commands for the set since all eight channels 168 are used to transfer the associated data. A limitation with this approach is that if the set 174 is being serviced, no other NVMe sets can be serviced during that time interval. While the set 174 only uses a single die from each channel, the set could also be configured to use multiple dies from each channel, such as 16 dies/channel, 32 dies/channel, etc.

A second example NVMe set is denoted at 176 in FIG. 4. This set uses dies 166 from less than all of the available channels 168. This arrangement provides relatively slower overall performance during data transfers as compared to the set 174, since for a given size of data transfer, the data will be transferred using fewer channels. However, this arrangement advantageously allows the SSD to service multiple NVMe sets at the same time, provided the sets do not share the same (e.g., an overlapping) channel 168.

Figure 5:
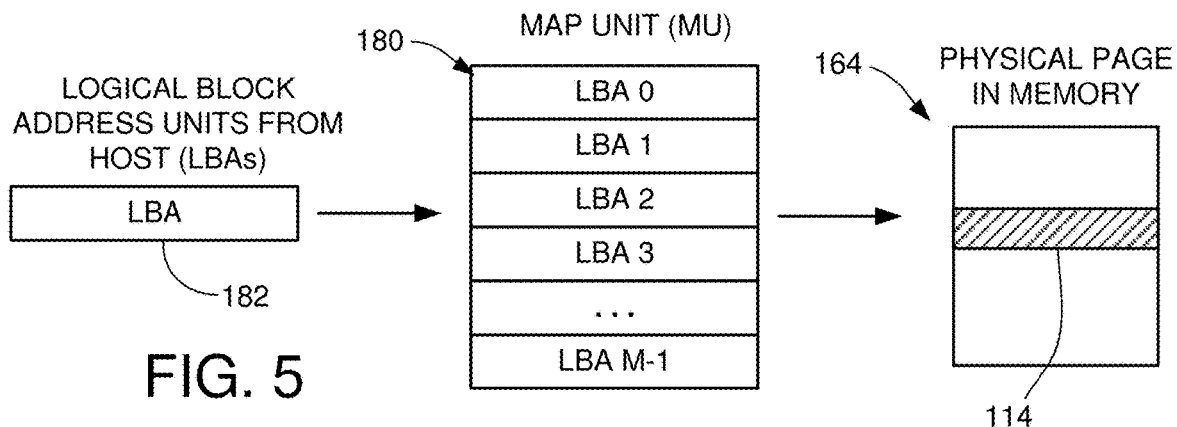
FIG. 5 illustrates a map unit (MU) as a data arrangement stored to the flash memory of FIG. 2.

FIG. 5 illustrates a manner in which data may be stored to a flash memory 164. Map units (MUs) 180 represent fixed sized blocks of data that are made up of one or more user logical block address units (LBAs) 182 supplied by the host. Without limitation, the LBAs 182 may have a first nominal size, such as 512 bytes (B), 1024B (1 KB), etc., and the MUs 180 may have a second nominal size, such as 4096B (4 KB), etc. The application of data compression may cause each MU to have a smaller size in terms of actual bits written to the flash memory 164.

The MUs 180 are arranged into the aforementioned pages 114 (FIG. 2) which are written to the memory 164. In the present example, using an MU size of 4 KB, then nominally four (4) MUs may be written to each page. Other configurations can be used. To enhance data density, multiple pages worth of data may be written to the same flash memory cells connected to a common control line (e.g., word line) using multi-bit writing techniques; MLCs (multi-level cells) write two bits per cell, TLCs (three-level cells) write three bits per cell; XLCs (four level cells) write four bits per cell, etc.

Data stored by an SSD are often managed using metadata. The metadata provide map structures to track the locations of various data blocks (e.g., MUAs 180) to enable the SSD 130 to locate the physical location of existing data. For example, during the servicing of a read command it is generally necessary to locate the physical address within the flash memory 166 at which the most current version of a requested block (e.g., LBA) is stored, so that the controller can schedule and execute a read operation to return the requested data to the host. During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Figure 6:
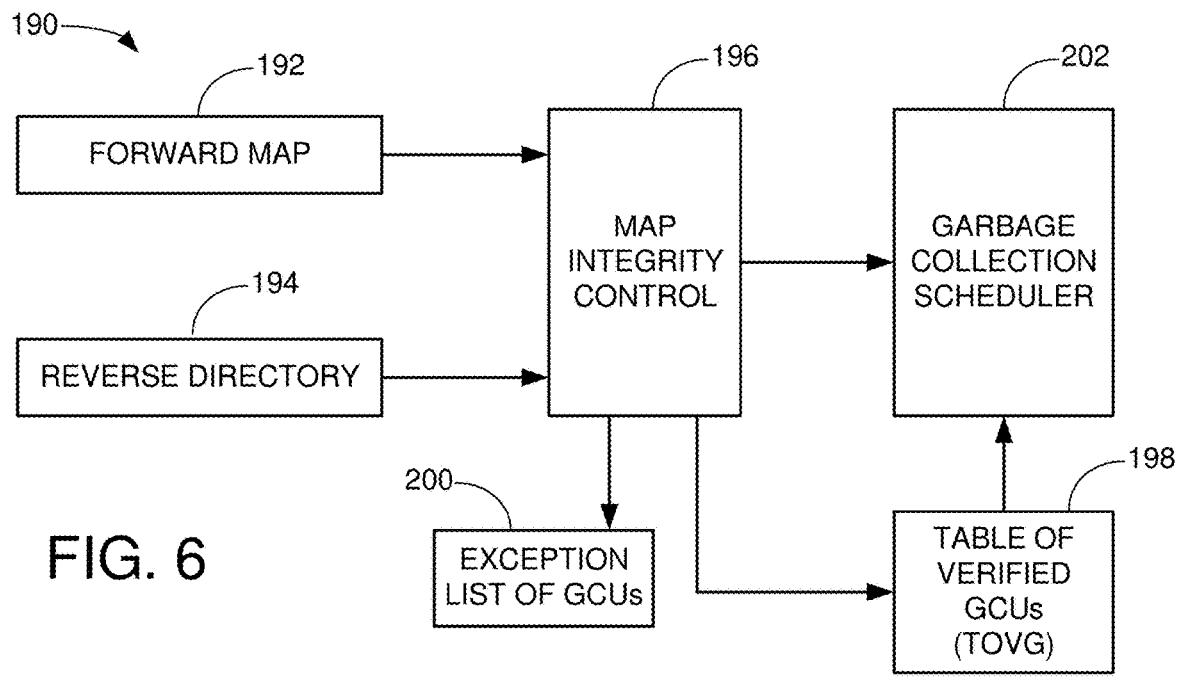
FIG. 6 displays a functional block diagram for a GCU management circuit of the SSD in accordance with some embodiments.

FIG. 6 shows a functional block diagram for a GCU management circuit 190 of the SSD 130 in accordance with some embodiments. The circuit 190 may form a portion of the controller 132 and may be realized using hardware circuitry and/or one or more programmable processor circuits with associated firmware in memory. The circuit 190 includes the use of a forward map 192 and a reverse directory 194. As noted above, the forward map and reverse directory are metadata data structures that describe the locations of the data blocks in the flash memory 164. During the servicing of host data transfer operations, as well as other operations, the respective portions of these data structures are located in the flash memory or other non-volatile memory location and copied to local memory 140 (see e.g., FIG. 3).

The forward map 192 provides a flash transition layer (FTL) to generally provide a correlation between the logical addresses of various blocks (e.g., MUAs) and the physical addresses at which the various blocks are stored (e.g., NVMe set, die, plane, GCU, EB, page, bit offset, etc.). The contents of the forward map 192 may be stored in specially configured and designated GCUs in each NVMe set.

The reverse directory 194 provides a physical address to logical address correlation. The reverse directory contents may be written as part of the data writing process to each GCU, such as in the form of a header or footer along with the data being written. Generally, the reverse directory provides an updated indication of how many of the data blocks (e.g., MUAs) are valid (e.g., represent the most current version of the associated data).

The circuit 190 further includes a map integrity control circuit 196. As explained below, this control circuit 196 generally operates at selected times to recall and compare, for a given GCU, the forward map data and the reverse directory data. This evaluation step includes processing to determine if both metadata structures indicate the same number and identify of the valid data blocks in the GCU.

If the respective forward map and reverse directory match, the GCU is added to a list of verified GCUs in a data structure referred to as a table of verified GCUs, or TOVG 198. The table can take any suitable form and can include a number of entries, with one entry for each GCU. Each entry can list the GCU as well as other suitable and useful information, such as but not limited to a time stamp at which the evaluation took place, the total number of valid data blocks that were determined to be present at the time of validation, a listing of the actual valid blocks, etc.

Should the control circuit 196 find a mismatch between the forward map 192 and the reverse directory 194 for a given GCU, the control circuit 196 can further operate to perform a detailed evaluation to correct the mismatch. This may include replaying other journals or other data structures to trace the history of those data blocks found to be mismatched. The level of evaluation required will depend on the extent of the mismatch between the respective metadata structures.

For example, if the forward map 192 indicates that there should be some number X valid blocks in the selected GCU, such as 12 valid blocks, but the reverse directory 194 indicates that there are only Y valid blocks, such as 11 valid blocks, and the 11 valid blocks indicated by the reverse directory 194 are indicated as valid by the forward map, then the focus can be upon the remaining one block that is valid according to the forward map but invalid according to the reverse directory. Other mismatch scenarios are envisioned.

The mismatches can arise due to a variety of factors such as incomplete writes, unexpected power surges or disruptions that prevent a full writing of the state of the system, etc. Regardless, the control circuit can expend the resources as available to proactively update the metadata. In some embodiments, an exception list 200 may be formed as a data structure in memory of GCUs that have been found to require further evaluation. In this way, the GCUs can be evaluated later at an appropriate time for resolution, after which the corrected GCUs can be placed on the verified list in the TOVG 198.

It will be noted that the foregoing operation of the control circuit 196 in evaluating GCUs does not take place once a garbage collection operation has been scheduled; instead, this is a proactive operation that is carried out prior to the scheduling of a garbage collection operation. In some cases, GCUs that are approaching the time at which a garbage collection operation may be suitable, such as after the GCU has been filled with data and/or has reached a certain aging limit, etc., may be selected for evaluation on the basis that it can be expected that a garbage collection operation may be necessary in the relatively near future.

FIG. 6 further shows the GCU management circuit 190 to include a garbage collection scheduler circuit 202. This circuit 202 generally operates once it is appropriate to consider performing a garbage collection operation, at which point the circuit 202 selects from among the available verified GCUs from the table 198. In some cases, the circuit 202 may generate a time of completion estimate to complete the garbage collection operation based on the size of the GCU, the amount of data to be relocated, etc.

As will be appreciated, a garbage collection operation can include accessing the forward map and/or reverse directory 192, 194 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 7:
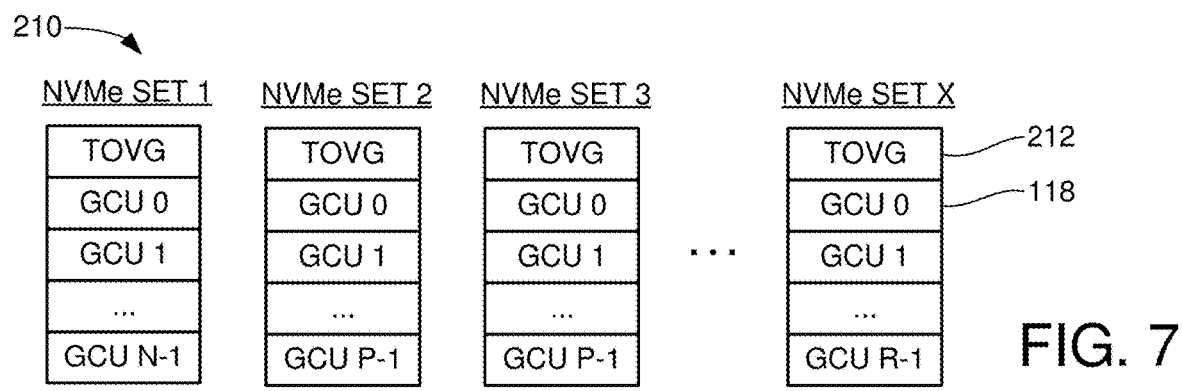
FIG. 7 represents an arrangement of various GCUs and corresponding tables of verified GCUs (TOVGs) for a number of different NVMe sets in some embodiments.

FIG. 7 shows a number of NVMe sets 210 that may be arranged across the SSD 130 in some embodiments. Each set 210 may have the same nominal data storage capacity (e.g., the same number of allocated dies, etc.), or each may have a different storage capacity. The storage capacity of each NVMe set 210 is arranged into a number of GCUs 118 as shown. In addition, a separate TOVG (table of verified GCUs) 212 may be maintained by and in each NVMe set 210 to show the status of the respective GCUs. From this, each time that it becomes desirable to schedule a garbage collection operation, such as to free up new available memory for a given set, the table 212 can be consulted to select a GCU that, with a high degree of probability, can be subjected to an efficient garbage collection operation without any unexpected delays due to mismatches in the metadata (forward map and reverse directory).

FIG. 8 illustrates a manner in which a parity data set 220 can be written to a selected GCU 118 in the flash memory 164 in accordance with some embodiments. In this example, it is contemplated that the selected GCU 118 is formed from sixteen (16) erasure blocks 116, with each of the erasure blocks disposed on a different die 166. Other sizes can be used as desired.

In FIG. 8, the parity data set has fifteen (15) user data pages 222, with each user data page, or payload, written to a different one of the dies. More generally, the GCU has N erasure blocks on a corresponding N dies, and payloads 222 are written to N−1 of the dies. The Nth die receives an outer code (parity value), which is represented at 224. As mentioned above, the outer code may be generated by summing the page data in a buffer using an XOR function. Because the parity data set 220 has data boundaries that nominally match the GCU boundaries, the parity data set in FIG. 8 is referred to as a standard parity data set since the data matches the available memory.

FIG. 9 shows an example non-standard parity data set 230. The parity data set 230 is the same size as the parity data set 220 in FIG. 8 in that, as before, the parity data set 230 has a total of fifteen (15) pages/payloads 232. However, one of the dies 166 has experienced a failure, as indicated at 234, so that the GCU only spans 15 dies.

Accordingly, the controller circuit 132 (FIG. 3) operates to write a full set of the available pages, which in this case is Page 1 to Page 14, through the available dies. This is followed by the writing of a first outer code (parity value) in the Nth location, as shown at 236, which protects the payloads (Page 1 to Page 14) written during this first pass through the available dies.

A leftover payload 238 (Page 15) is written to the next available page in the first die (such as adjacent Page 1). This leftover payload is referred to as a runt or runt data, and represents the remainder after an integer number of passes have been made through the available dies. Once all of the leftover payloads have been written, a second outer code (parity value) is written in the next available die, as shown at 240. This second outer code is disposed in the same die as, and is adjacent to, the Page 2 payload.

In this way, when leftover (runt) payload sets remain, these are written to as many additional dies as are required, followed by the writing of a final parity value to cover the runts. Map data may be generated to note the non-standard outer code arrangement. This provides a parity data set with a parity value to protect each pass through the dies, plus another parity value to cover the remainder.

While FIG. 9 shows the non-standard parity data set has arisen due to a non-standard sized available memory (e.g., due to the die failure at 234), other non-standard parity data sets can arise based on other factors. For example, a particular data set to be written to a given NVMe set may make up a total number of MUs that do not align with the GCU boundaries. In another case, data compression or other processing may result in a non-standard sized parity data set.

It will be appreciated that if a given GCU has N dies, then a non-standard sized data set will have a total number M payloads (or portions thereof) that are not divisible by N without a remainder. The remainder could be any value from one extra payload up to N−1 extra payloads. Regardless, each pass through the dies will be parity protected, irrespective of the overall length of the parity data set.

Once a non-standard parity set is written, map data may be generated and stored to indicate the fact that the parity data set is of non-standard length. Information may be stored in the map data such as how much longer the data set is in terms of additional pages in the remainder, the location of the last parity value (e.g., 240), etc. To maximize data density, the controller may operate to initiate the writing of the next parity data set at the next available page on the next die in the sequence, as shown at 242 in FIG. 9.

FIG. 10 shows a functional block representation of additional aspects of the SSD 130. The core CPU 136 from FIG. 3 is shown in conjunction with a code management engine (CME) 244 that can be used to manage the generation of the respective code words and outer code parity values for both standard and non-standard parity data sets During write operations, input write data from the associated host are received and processed to form MUs 180 (FIG. 5) which are placed into a non-volatile write cache 246 which may be flash memory or other form(s) of non-volatile memory. The MUs are transferred to the DMM circuit 154 for writing to the flash memory 164 in the form of code words that contain user data, inner code, and outer code. During read operations, one or more pages of data are retrieved to a volatile read buffer 248 for processing prior to transfer to the host.

The CME 244 determines the appropriate inner and outer code rates for the data generated and stored to memory. In some embodiments, the DMM circuit 154 may generate both the inner and outer codes. In other embodiments, the DMM circuit 154 generates the inner codes (see e.g., LDPC circuit 160 in FIG. 3) and the core CPU 136 generates the outer code words. In still other embodiments, the same processor/controller circuit generates both forms of code words. Other arrangements can be used as well. The CME 244 establishes appropriate code rates for both types of code words.

During generation of the outer codes, a parity buffer 250 may be used to successively XOR each payload being written during each pass through the dies. Both payload data 252 and map data 254 will be stored to data locations in flash 164.

FIG. 11 is a block representation of portions of an example data storage device 260 in which data is arranged into a plurality of code words 262 that can efficiently be stored, and retrieved, from one or more SSD storage destinations. A page 150 of data may comprise a number of consecutive, or non-consecutive, code words 262 organized to effectively fit in the available space of an SSD.

As shown, a code word 262 can consist of user data 264 and inner code 266 generated to complement the user data 264, such as by the LDPC circuitry 138. The inner code 266 can provide a diverse variety of capabilities, such as error correction via error correction code (ECC), data status, data offset, and other data control information. The combination of user data 264 and inner code 266 together in a code word 262 allows for efficient analysis, verification, and correction (if necessary) of errors in reading, or writing, the user data 264 to/from memory. However, the inner code 266 may be insufficient, in some cases, to overcome and/or correct errors associated with storage of the code word 262. Hence, various embodiments generate outer code that provides higher-level data analysis and correction in complementary fashion to the inner code 266.

Figure 12:
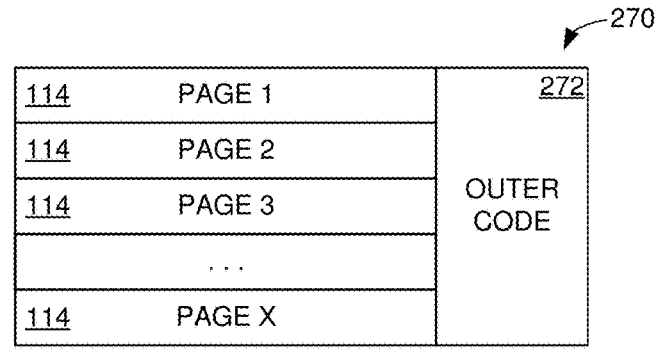
FIG. 12 shows a block representation of portions of an example data storage device configured in accordance with various embodiments.

FIG. 12 conveys a block representation of a portion of an example data storage device 270 where pages 150 of code words 262 are stored in combination with outer code 272 in accordance with some embodiments. The outer code 272 may be associated with one or more pages 150 of code words to provide data that describes the constituent code words 262 and allows for verification and correction of the accuracy, and reliability, of the user data of the respective code words 262.

It is contemplated that the outer code 272 can operate to correct errors and faults that occur during the reading, or writing, of the code words 262. Such corrective function of outer code 272 allows user data to be retrieved despite encountered errors/faults that were uncorrectable by inner code 266. In some embodiments, a probation counter for the user data and/or the physical address of memory where the user data 264 is stored is maintained in the inner code 266, outer code 272, or elsewhere in memory to allow a physical address and/or user data to be monitored in real-time with simple polling of the probation counter.

The ability to correct and recover from encountered error during data access operations to a memory provides additional longevity and reliability for a memory and the data stored therein. However, this ability comes at a relatively high system resource price as processing, storage capacity, and time are expended to correct errors and recover data. The use of such system resources can jeopardize the data storage and retrieval performance for some, or all, of a distributed data storage system. Regardless of the sophistication, efficiency, or accuracy of error/failure recovery in a data storage device, the inefficient retrieval of stored data can jeopardize the performance of a data storage device as well as reduce the operational lifespan of the memory constituent in the device.

Figure 13A:
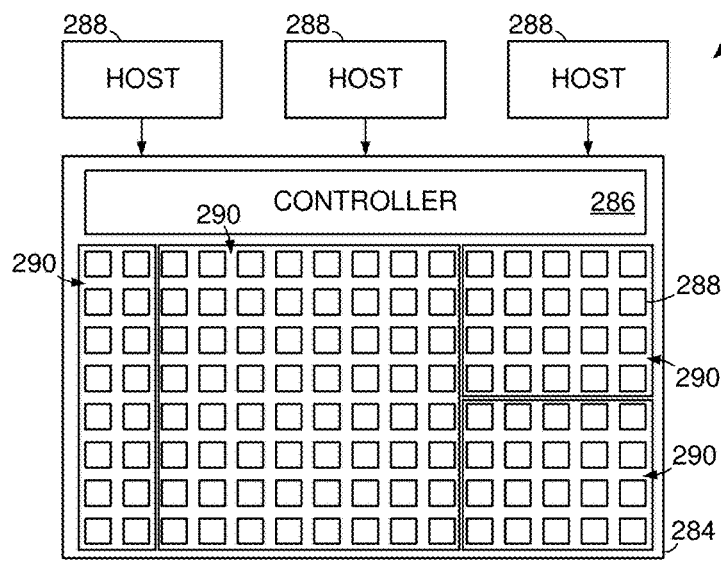
FIGS. 13A and 13B respectively depict block representations of assorted portions of example data storage systems that can be utilized in accordance with some embodiments.
Figure 13B:
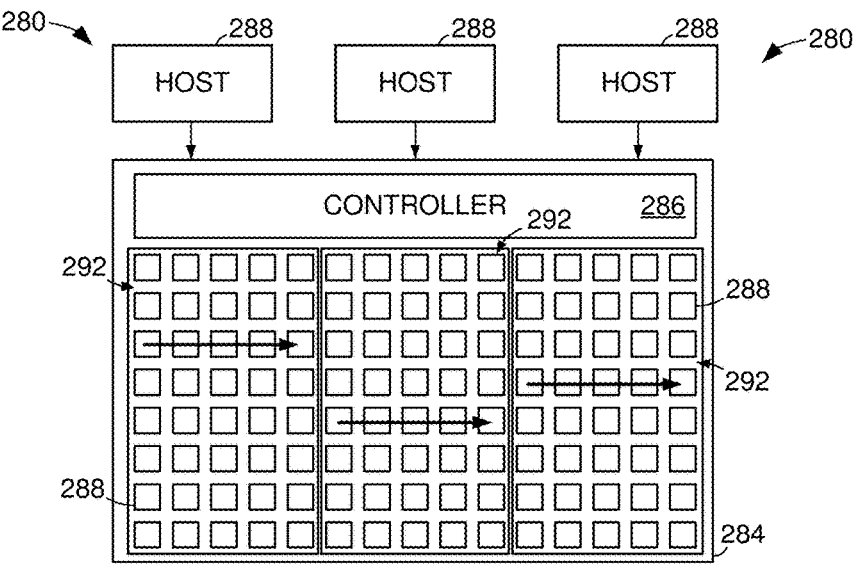

FIGS. 13A and 13B respectively depict portions of an example data storage system 280 arranged and utilized in accordance with assorted embodiments. The system 280 of FIG. 13A shows how multiple separate hosts 282 are connected to a data storage device 284 that employs a local drive controller 286 to direct data accesses in one or more memory cells 288. It is noted that the data storage system 280 can employ any number of hosts 282 connected to one or more data storage devices 284 via any number of wired and/or wireless connections.

The drive controller 286 can organize the assorted memory cells 288 into various logical namespaces 290 that can span any physical memory cell configuration, such as one or more platters, die, planes, or pages. The various namespaces 290 can provide selective writing of data, which can be utilized for dedicated streaming of data from one or more hosts, wear-leveling of data across amongst available memory cells 288, and reduced data access latency in some situations. However, the generation and maintenance of namespaces 290 can increase write amplification and mapping cache needs in addition to greater volumes of over-provisioning space.

FIG. 13B conveys how the data storage system 280 can be logically arranged into zoned namespaces 292 that involve protocol to sequentially write data from the beginning data block address of each zone 292 without the ability to overwrite or erase anything but an entire zone 292, as illustrated by arrows. The logical namespaces 292 provide the ability to allow a host 282 direct access to portions of memory, which can reduce latency while increasing data throughput and cost efficiency. Compared to non-zoned namespaces 290, zoned namespaces 292 allow for separate host workloads with less over-provisioning and write amplification. Yet, the treatment of a zoned namespace 292 as a collective data unit that must be sequentially written and only erased as a whole increases front-end processing and buffer space for data accesses, mapping, and organization.

The logical organization of memory cells 288 into namespaces 290/292, particularly zoned namespaces 292, can create processing and implementation difficulties when the namespace 292 spans physical block addresses of cells 288 located in separate locations, such as different data storage devices or die of a single data storage device. For instance, the erasing of the entirety of a zoned namespace 292 spanning separate physical block addresses can involve different channels, memory cell 288 maintenance operations, and delays compared to a namespace 292 located in a single physical memory, such as a single die or plane of cells 288.

Figure 14:
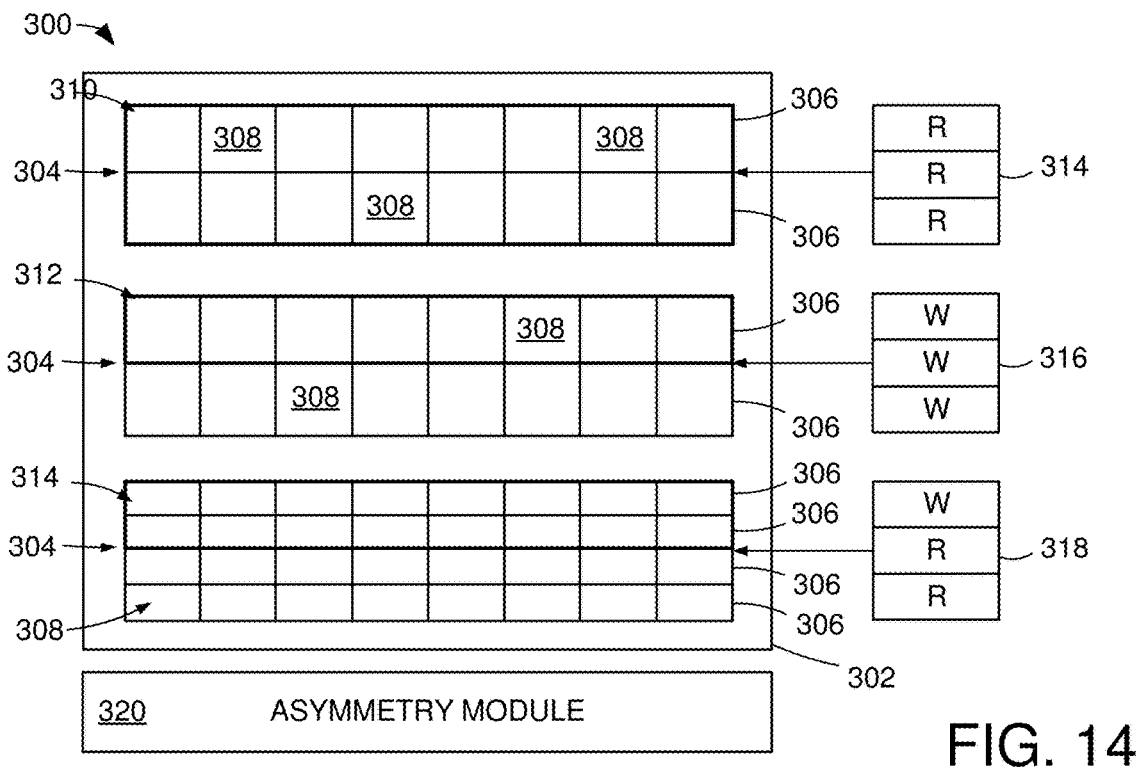
FIG. 14 depicts block representations of portions of an example data storage system operated in accordance with some embodiments.

FIG. 14 depicts a block representation of portions of an example data storage system 300 arranged in accordance with various embodiments. The system 300 can employ any number of data storage devices that each consist of at least one solid-state memory 302. The memory 302 is physically arranged into a plurality of different die 304 that each have a number of planes 306 consisting of blocks 308 of memory cells. It is noted that blocks of memory cells can be replaced by pages of memory cells without altering the organization or function of the memory. It is contemplated that some planes 306 are configured with single level cells that have two logical states while other planes 306 have multi-level cells that have more than two logical states.

The memory 302 can be logically managed through the generation and management of one or more namespaces 310, 312, and 314. In the non-limiting example shown in FIG. 14, the respective namespaces 310, 312, and 314 to each be contained within particular die 304 with a first namespace 310 spanning both planes 306 while namespaces 312 and 314 each span less than all the planes 306 of the respective die 304. The use of the various namespaces 310/312/314 can provide reduced write amplification, over-provisioning, and buffer requirements for data access operations, but can be plagued by asymmetry. It is noted that asymmetry is meant as a difference in satisfying a read request to a namespace compared to satisfying a write request, such as differences due to data access latency, error rate, and channel efficiency. Hence, read/write asymmetry can be defined as a difference in total time to satisfy a read request versus a write request due to one or more operational reasons.

Although not required or limiting, a data stream to the first namespace 310 illustrates how read/write asymmetry can create operational deficiencies when one or more data read requests (R) to the namespace are pending in a queue 316 until the completion of a data write (W). The second namespace 312 conveys how data writes can be waiting in a queue 316 on random reads, which can also be operationally inefficient due to the asymmetry between satisfying data reads and data writes. The execution of memory background operations (B), such as garbage collection, data moving, data mapping, and memory cell refreshing, can cause operational asymmetry as data accesses are pending in a namespace queue 316.

While creative buffering strategies can utilize separate buffers to alleviate the operational deficiencies associated with read/write asymmetry, such buffer utilization can create operational degradation as increased channel, power, and processing resources may be consumed by relocating data access requests while keeping an assigned namespace destination 310/312/314. Hence, the use of namespaces can suffer from read/write asymmetry in a variety of different manners, which can create difficulties in satisfying predetermined data access expectations, such as quality of service (QoS), deterministic input/output (IOD), and guaranteed error rates.

It is noted that different namespaces can concurrently have different read/write asymmetry that can further plague the consistent performance of a data storage system 300 over time. Accordingly, an asymmetry module 320 connected to the memory 302 provides intelligent, workload-based compensation for read/write asymmetry to reduce and maintain minimal operational differences in satisfying data read requests compared to data write requests.

Figure 15:
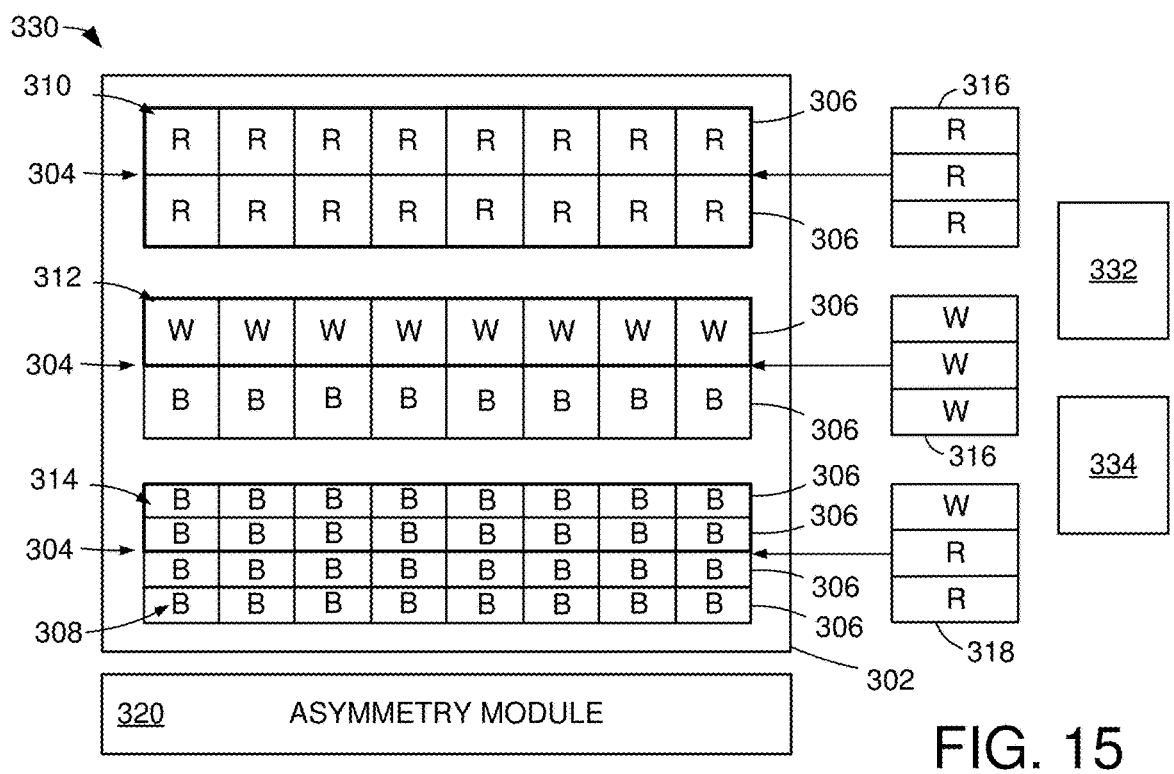
FIG. 15 depicts a block representation of portions of an example data storage system configured and utilized in accordance with various embodiments.

FIG. 15 depicts a block representation of portions of an example data storage system 330 in which assorted embodiments can be practiced. Although a single data storage device memory 302 is shown in FIG. 15, such system 330 configuration is not limiting as numerous separate data storage device, and memories can be connected to a controller 332 to carry out various data access requests and background operations. A controller 332 can be local to the data storage device, such as physically positioned within a data storage device housing, or remote to the device, such as external to a device housing. The controller 332 can schedule, execute, and monitor a number of different data accesses to satisfy requests from a number of different remote hosts.

Through operation of the controller 332, one or more operational asymmetries can exist that pose difficulties for satisfying predetermined data access performance expectations for one or more namespaces, as generally discussed in the system 300 of FIG. 14. Accordingly, the controller 332, in association with an asymmetry module 320, can monitor past, current, and pending data access activity to one or more namespaces 310/312/314 to determine the real-time namespace workload. The computation and monitoring of namespace workloads allows the controller 332, and/or asymmetry module 320, to react to elevated levels of namespace workload by changing one or more namespace operational policies in an effort to reduce read/write asymmetry while increasing data access performance consistency and access performance characteristics.

Among the namespace operational policy changes that can be executed in response to a namespace workload threshold being met, a second controller 334 can be activated and/or dedicated to segregate the handling of data reads and data writes. That is, a namespace operational policy change can be utilizing dual controller 332/334 to carry out pending data access requests and/or background operations to reduce the asymmetry between satisfying data reads and data writes. The use of an additional controller 334 can provide ample processing resources to schedule, move, reorganize, and execute pending data access requests with less variability than if a single controller 332 was involved.

Another example namespace operational policy change that can be triggered by a predetermined volume of namespace workload involves utilizing different clock speeds for data reads and data writes. Such dynamic clock speed can be characterized as burst mode and can provide an accelerated, or delayed, satisfaction of some data access requests to accomplish more consistency between data read and data write performance. It is noted that reduced read/write asymmetry may not correspond with maximum potential data access performance for a memory cell or namespace and can, instead, correspond with greater consistency and reliability of satisfying data accesses over time.

Reaching a workload volume for a namespace can trigger the intelligent throttling of data accesses. For instance, a controller 332/334, and/or asymmetry module 320, can insert delays into data access satisfaction in order to balance the overall average time to satisfy a data read compared to a data write. Throttling, in some embodiments, involves altering the operation of hardware, such as signal transmitting channels. Direct channel throttling can involve intentionally lowering the data access request satisfaction potential for one or more channels while indirect throttling can involve redirecting power to particular channels, which reduces the available power and access satisfaction potential of other channels.

Other namespace operational policy changes induced by reaching a namespace workload volume can involve selectively using random or sequential data reads. The ability to use either sequential or random reads can complement a hierarchical provisioning of buffer memory, electrical power, and/or processing resources to provide dynamic management of read/write asymmetry. Intelligent selection and/or reorganization of data access queues may also provide the data storage system 330 with robust namespace operational policy changes that can reduce asymmetry without degrading overall maximum, and/or average, data access performance to a namespace or device 302.

Figure 16:
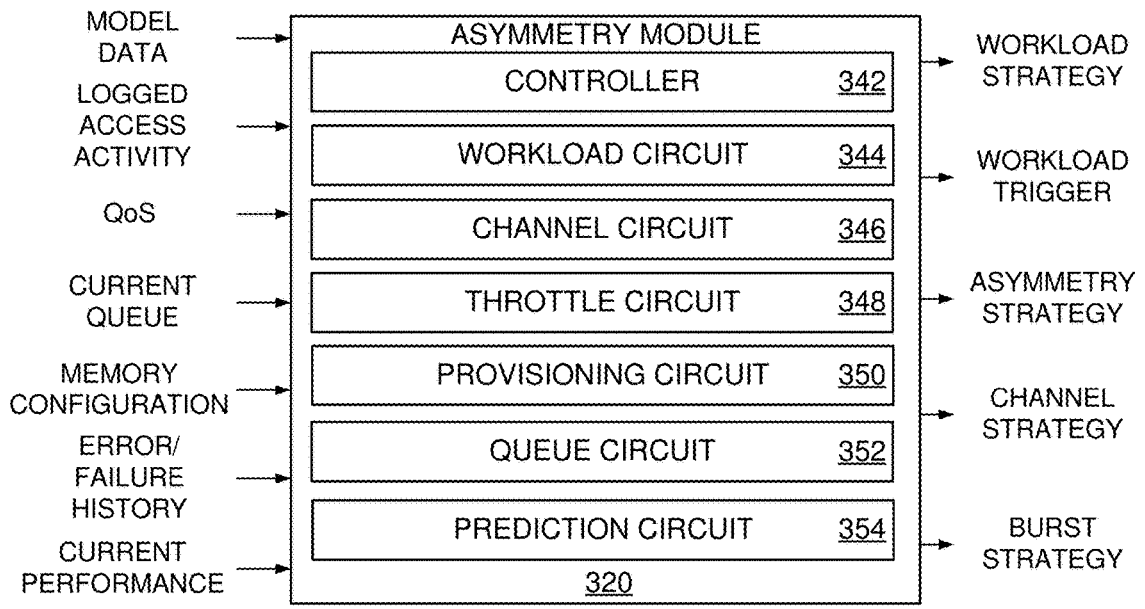
FIG. 16 depicts a block representation of an example asymmetry module that can be employed in assorted embodiments of a data storage system.

FIG. 16 depicts a block representation of an example asymmetry module 320 that can be employed in a data storage system in accordance with assorted embodiments. The module 320 can utilize one or more controllers 342 to translate a variety of input information into at least a workload detection strategy, a workload trigger, an asymmetry strategy, a channel strategy, and a burst strategy that can be selectively, and concurrently, conducted to provide namespace optimization. The module controller 342 may be a standalone circuit, such as a microprocessor or other programmable circuitry, resident anywhere in a data storage system, such as in a standalone node, network node, host, or data storage device.

Regardless of where a controller 342, and module 320, is located in a data storage system, the data access activity to one or more memories can be monitored and logged along with the current memory configuration, security protocol, quality of service criteria, and data locations. The module controller 342 can input past logged information, such as error rate, data access latency, location of stale data, and garbage collection activity. While current and past information about the data storage system in which the module 320 is resident can be procured, the controller 342 may additionally refer to one or more data models pertaining to other data storage systems, memories, or host access activity.

While not limiting, the power module 320 can input assorted current and past logged conditions for one or more memories of a data storage system. For instance, the current physical block addresses of various calibration groups, the addresses of past data access errors and failures, the current physical and logical configurations of memory cells, and the pending data operations to the memory cells can be utilized individually, and collectively, to understand current namespace configurations and performance as well as future cell arrangements for namespace optimization.

The power controller 342 can operate alone to generate and maintain the various strategies to control current and future namespace workloads, configurations, and data access operations. However, some embodiments employ assorted circuitry to aid the power controller 342 in efficiently creating, altering, and executing the respective output strategies, data access throttling, channel utilization, operational clock speeds, and memory cell allocations in namespaces. A workload circuit 344 can assist the module controller 342 in translating the various input information into a workload strategy that has one or more triggers that correspond with a namespace operational policy change in order to mitigate, or eliminate read/write asymmetry for at least one namespace.

Although not required or limiting, the workload circuit 344 can generate and maintain multiple workload strategies for separate namespaces, which allows for concurrent optimization of the respective namespaces through the execution of different operational policy changes prescribed by the respective workload strategies in response to detected, or predicted, activity that meets a predetermined workload trigger. For instance, a first namespace may have a first workload strategy generated by the workload circuit 344 that prompts the execution of a first set of namespace operational policy changes, such as multiple controller activation, channel manipulation, data access throttling, clock speed manipulation, and/or random read/write operation, in response to a first trigger being met while a second namespace of a system has a different workload strategy and triggers that prompt a different set of operational policy changes customized to the second namespace.

A channel circuit 346 can evaluate the configuration and performance of various hardware channels to determine what data access performance is being provided and what performance capabilities the hardware channels could provide. Such evaluation allows the channel circuit 346 to contribute to the asymmetry strategy while generating a separate channel strategy that prescribes a variety of different channel operational parameters, such as power consumption, bandwidth, and signal volume. The channel strategy can operate independently, or concurrently, with the asymmetry strategy that can prescribe other namespace operational policy changes that may, or may not, involve hardware channel manipulation. For example, an asymmetry channel can throttle data accesses to a namespace via indirect throttling of a channel with operational parameters set by the channel strategy.

A throttling circuit 348 can contribute operational parameters, as well as policy changes to mitigate/eliminate read/write asymmetry, to the respective asymmetry and channel strategies in response to various workload triggers assigned by the workload circuit 344 to particular namespaces. The throttling circuit 348 can direct the generation of direct and/or indirect throttling parameters of various aspects of a data storage system to mitigate/eliminate read/write asymmetry. With direct throttling, the throttling circuit 348 can prescribe intentional delays, or deactivations, of one or more hardware channels, buffer memories, and/or logical queues for a range of time. Indirect throttling can be achieved by diverting activity to hardware channels, buffer memories, and/or logical queues to provide greater data access performance bandwidth to some system components, which reduces the available bandwidth for other system components and causes those components to have a reduction in data access performance While it is contemplated that memory cells, logical queues, and buffer memories can statically remain assigned over time, various embodiments provide dynamic provisioning of memory cells, logical queues, and/or buffer memories to control and mitigate read/write asymmetry. A provisioning circuit 350 can generate one or more namespace operational policy changes for at least the asymmetry strategy that alters the allocation of memory cells and/or handling of data access requests to induce a change in read/write asymmetry in at least one namespace. To make dynamic memory allocation more efficient and effective, the provisioning circuit 350 can rank the assorted namespaces, hardware channels, and memory cells. Such ranking allows the module controller 342 to efficiently execute prescribed operational modifications to the most intelligent aspects of a data storage system.

For example, the provisioning circuit 350 can create multiple rankings for the risk of asymmetry in a namespace compared to data access performance of the namespace as a whole, constituent memory cells, data storage devices, and/or hardware channels, which provides the asymmetry strategy with dynamic reactions to detected, or predicted, namespace workloads. Hence, the association of predetermined data access operation alterations from a asymmetry strategy to change how memory is allocated and/or how data access requests are handled is optimized by ranking the location and order of the prescribed namespace operational policy changes. As a result, the module controller 322 can simply execute the prescribed operational changes from the asymmetry strategy on the current, or predicted, rankings of a particular granularity, such as by device, memory, die, plane, or block or memory.

In some embodiments, the provisioning circuit 350 can generate and maintain one or more logs of data access activity and memory operations that can be pertinent to identifying current, pending, and future workloads to various zoned namespaces. The provisioning circuit 350 can set, and alter, the metrics which it logs over time and the granularity for which those metrics are tracked. For instance, the temperature for an memory cell can initially be logged by the provisioning circuit 350 before altering the granularity of the temperature tracking to a per-die or per-plane basis, as directed by the module controller 342 and at least one predetermined strategy. Another non-limiting example of the provisioning circuit 350 logs data access type and frequency to identify if a namespace is hot or cold with respect to host data access requests, which allows the module controller 342 to assign a workload evaluation for a namespace that represents how much activity a namespace is experiencing. It is noted that the provisioning circuit 350 may determine various types of workload for assorted data storage system namespaces, such as volume of data accesses over time, amount of processing overhead consumed by accesses to a namespace, or volume of available namespace memory occupied by valid, current user-generated data.

The monitoring of data access and memory activity to determine namespace workloads allows the provisioning circuit 350, in combination with the module controller 342, to generate and maintain a workload strategy that sets one or more workload trigger events that correspond with reactive and/or proactive alterations to current namespace operational policy. That is, a workload strategy can comprise a number of different workload trigger events, such as number of errors, available memory, volume of processing available, or number of memory cell accesses over time, that prompt the execution of one or more namespace operational policy alterations, as prescribed in the workload strategy, to maintain, mitigate, or reduce the workload on a namespace. The identification and control of namespace workloads allows the asymmetry module 320 to optimize namespace read/write asymmetry by customizing how data accesses are conducted to the assorted namespaces of a data storage system.

In addition to the workload strategy, the module controller 342 can generate and maintain a burst strategy that is directed at providing a temporary operational mode where different clock speeds are concurrently utilized to control and/or correct asymmetry between satisfying data read requests compared to data write requests. The burst strategy can activate in response to one or more workload triggers to employ different clock speeds within a single namespace, such as different speeds for reads compared to writes, or between multiple separate namespaces, such as different read clock speeds to separate namespaces. Some embodiments of the burst strategy employs different clock speeds for different data writes to a single namespace in order to manipulate the overall average request satisfaction times and the corresponding read/write asymmetry.

Asymmetry may be manipulated by altering how, and potentially where, data and data access requests are stored while being satisfied. A queue circuit 352 can assess current, pending, and future queues and buffer memories to determine what type of request are associated with current and pending workloads to the various namespaces of a data storage system. The queue circuit 352 can provide the asymmetry strategy with one or more policy changes involving the reorganization, prioritizing, and/or reconfiguring of a queue and/or buffer memory. For instance, the queue circuit 352 can prescribe changing the order of data access requests in a logical queue, the location of data in a buffer memory, the size of a queue, and the order in which different queues are executed in response to one or more namespace workload triggers.

The queue circuit 352, also, can generate new logical queues to temporarily, or permanently, store data access requests. As a non-limiting example, the asymmetry strategy can prescribe a particular controller to execute a queue, or a type of requests in a single queue, while a different controller executes a separate queue, or a different type of requests in the single queue. The ability to proactively alter the logical queues and hardware buffer memories assigned to assorted namespaces in response to namespace workloads allows for quick adaptations of namespace operation to mitigate and/or eliminate read/write asymmetry, which reduces the time and processing resources being consumed in controlling how dynamic workloads generate namespace read/write asymmetry.

The execution of one or more strategies generated by the asymmetry module 340 provides a balance of data access request satisfaction speed with average data access request satisfaction times that meets a predetermined Quality of Service (QoS) standard, deterministic input/output window, or performance threshold. The ability to conduct namespace operational policy changes with the asymmetry, channel, and burst strategies while the workload strategy identifies and controls the workload actually experienced by assorted logical namespaces of a data storage system allows the asymmetry module 340 to intelligently adapt to changing memory and data access activity to continually provide performance in accordance with predetermined expectations.

Through the intelligent allocation of memory, the asymmetry module 340 can provide consistent, reliable data storage and retrieval performance for a namespace. The ability to reactively and/or proactively send data to memory cells having varying performance allows the module 340 to intelligently position data to withstand changing data access conditions due to varying memory characteristics and/or data access activity. The generation of assorted aspects of the workload and other strategies can provide sophisticated reactions to encountered namespace workloads as well as proactive actions that mitigate namespace data access performance degradation when conditions and/or activity change.

The proactive generation of the workload and power strategies by the asymmetry module 340 allows the module controller 342 to execute workload and namespace operation control actions quickly and efficiently once a workload trigger is reached. In contrast, purely reactive generation of namespace operation manipulation actions by the asymmetry module 340 would involve additional processing and time to evaluate and generate the proper action(s) to establish workload control and provide continued namespace data access performance to satisfy one or more predetermined expectations. While the saving of processing overhead, the configuration of the respective workload and read/write asymmetry control strategies with both reactive and proactive actions provide intelligent long-term namespace optimization that cannot be achieved with static namespace utilization policies or purely reactive generation of action(s) to control and optimize the operation of namespaces in view of workload.

The generation of proactive actions and identifying future workload and namespace operational performance for the respective strategies is aided by a prediction circuit 354. A prediction circuit 354 can input assorted current and past operations, actions, and activity, along with model data from other memory, to forecast at least one future namespace operational condition, data access request, or data access performance. The accurate prediction of memory and namespace conditions along with data access performance allows the respective strategies generated by the asymmetry module 340 to have namespace operational policy adaptations to mitigate, or completely avoid, a forecasted future operational occurrence of difference between read and write request satisfaction. The prediction circuit 354 can further forecast how long different strategy actions will take for varying system conditions, which allows the module 340 to quickly adjust between different namespace actions to provide a practical workload control and maintain namespace operational performance without unduly stalling or degrading overall data storage system performance.

Figure 17:
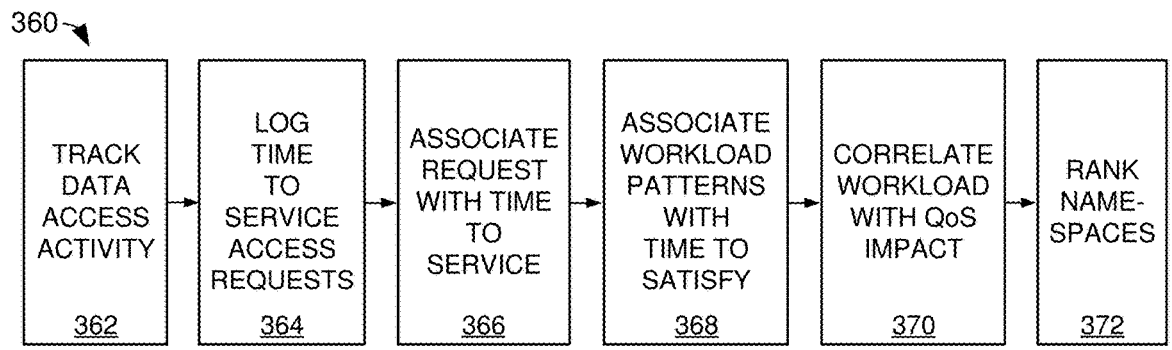
FIG. 17 depicts a timeline of an example workload detection procedure executed in accordance with assorted embodiments.

FIG. 17 depicts an example workload detection procedure 360 that can be carried out in a data storage system via a power module in accordance with various embodiments. Data accesses are tracked in step 362 by the power module. As such, the power module can track assorted data access metrics concurrently or sequentially. The overall time to service a data access request is logged by the power module in step 364. It is noted that the overall time to satisfy a data access request is not the only activity tracked in 362, but such activity tracking can be prioritized by redundantly monitoring and interpreting the elapsed time from submission of a data access request by a host to the return of data, in the case of a read request, or the writing of data to a namespace, in the case of a write request.

The logged time to service a data access request can be evaluated in isolation or with the service times of other data access requests to a namespace to determine how long a new data access request to a namespace would take to service. As a result of the logging of actually completed data access requests in step 364 along with the association of new data access requests with an estimated time to service, the power module can compile the workload for a namespace. That is, the combination of previously satisfied data access requests and estimated time to service new requests provides enough information for a power module to determine the workload for a namespace. Hence, the power module generates and maintains a workload value for each namespace that corresponds to how long a data access request takes to be satisfied. A namespace workload further corresponds to the memory cell operational performance of a namespace as well as the current channel and processor capabilities that service memory cells of a namespace.

With the logging of actual request satisfaction times in step 364 and the association of future requests with request satisfaction times in step 366, the power module can compile workload values over time for each namespace of a device/system. The tracking of workloads to various namespaces allows the power module to identify various workload patterns that reliably indicate future data access request satisfaction times, processing requirements, and buffer memory requirements in step 368. The combination of the determination of namespace workload and the association of workload patterns with future namespace time to satisfy a data access request provides ample information for the power module to correlate current namespace workload with an impact to predetermined namespace operational performance and/or power consumption expectations in step 370, such as QoS, deterministic window, error rate, and average data access latency.

Through the tracking of workloads and correlation of those workloads with impact to predetermined namespace operational performance, the power module can rank the various available namespaces in step 372 with the aid of the ranking circuit. Such namespace ranking can organize namespaces by availability, efficiency, reliability, read performance, or write performance. For instance, the power module can rank namespaces in step 372 by which namespaces can service a request most quickly (availability), with least processing and/or power consumption (efficiency), with least error rate (reliability), read request latency, average request service time, or write request latency. The ranking of namespaces allows the power module to generate and adjust namespace optimization strategy policy actions that provide the greatest opportunity to satisfy performance expectations in view of current and future predicted namespace workloads.

Figure 18:
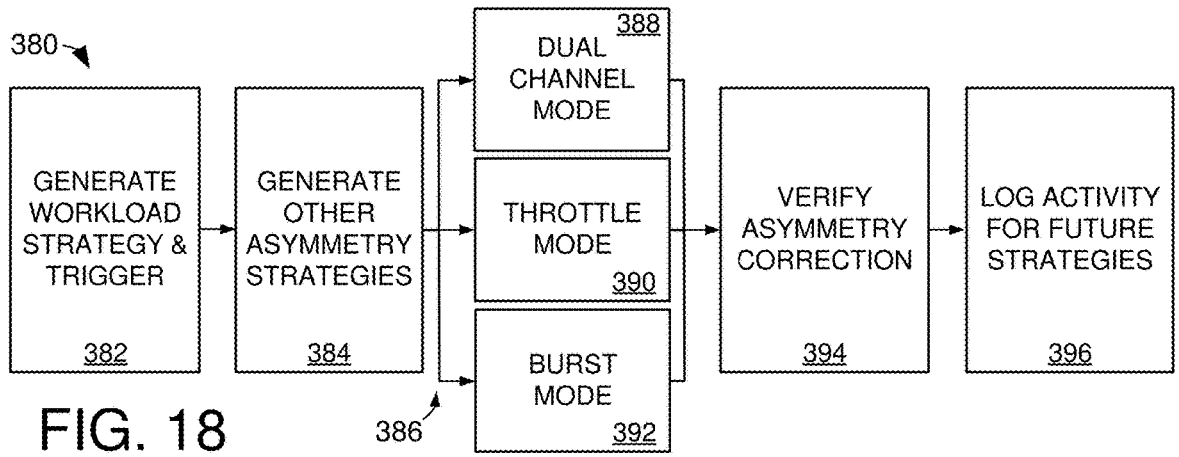
FIG. 18 depicts a timeline of an example asymmetry procedure that is compatible with various embodiments of a data storage system.

FIG. 18 depicts an example asymmetry procedure 380 that can be executed by an asymmetry module to one or more logical namespaces of a data storage system. After logging data access activity from an initialized data storage system that connects at least one remote host to at least one data storage device, a workload strategy is generated by the asymmetry module in step 382. The workload strategy prescribes at least one workload trigger for each namespace that corresponds with a current, pending, or predicted volume of host-generated activity, such as data write and data read requests, and/or background operations, such as garbage collection, memory refresh, memory calibration, and data mapping.

Step 384 can sequentially, or concurrently with step 382, translate various input information into assorted read/write asymmetry controlling strategies, such as the asymmetry, channel, and burst strategies shown in FIG. 16. The presence of the various strategies lays out a number of different proactive and/or reactive namespace operational policy changes tied to a volume of detected, or predicted, workload for a namespace. Upon a workload trigger being met, or predicted at event 386, the asymmetry module can direct the execution of one or more prescribed operational alterations to an existing policy for a namespace.

As illustrated, a diverse variety of policy alterations can be conducted in response to a workload trigger being met at event 386. Although not required or limiting, an asymmetry strategy can prompt step 388 to deviate from existing policy to conduct dual channel mode with at least one additional hardware channel being newly activated, or operated with altered parameters, to handle data access requests and/or background memory operations. Alternatively, step 388 can utilize multiple channels and/or controllers to execute an asymmetry strategy to alter how data is queued and/or buffered, the order in which existing queued requests are executed, and the number of queues servicing a namespace. It is contemplated that the asymmetry strategy execution of step 390 is conducted in throttle mode where one or more data accesses and/or memory background operations are altered.

The manipulation of data access execution speed may alternatively occur by executing a burst strategy to engage burst mode in step 392 where different clock speeds are utilized to complete various data access and memory background operations. Read/write asymmetry may also be controlled by executing a channel strategy that alters the existing policy for at least one hardware signal transmitting channel. Execution of the channel strategy can involve deviation of power consumption, inserted temporal delays, and complete deactivation to provide the prescribed leveling of time to satisfy a host-generated data read request compared to a host-generated data write request. The ability to provide direct or indirect throttling of a hardware channel provides a change in how data reads, or data writes, are satisfied in order to balance the overall average time a request is completed back to a host.

It is noted that more than one operational policy change can be concurrently conducted for a namespace through the simultaneous execution of different strategies in response to a detected, or predicted, workload trigger being reached. Regardless of the number and type of executed policy changes in response to a workload trigger, step 394 proceeds to verify that read/write asymmetry has been at least reduced with the asymmetry module. To complete step 394, the asymmetry module may log various read and/or write requests or may conduct one or more test patterns with module-generated requests in step 396 to determine if asymmetry performance for a namespace has been improved. By conducting a verification for the policy changes made after a workload trigger has been reached, the actual operational asymmetry for a namespace can be quantified by the asymmetry module, which allows the module to determine if additional policy, or strategy, changes can make asymmetry manipulation more efficient or accurate in the future.

Figure 19:
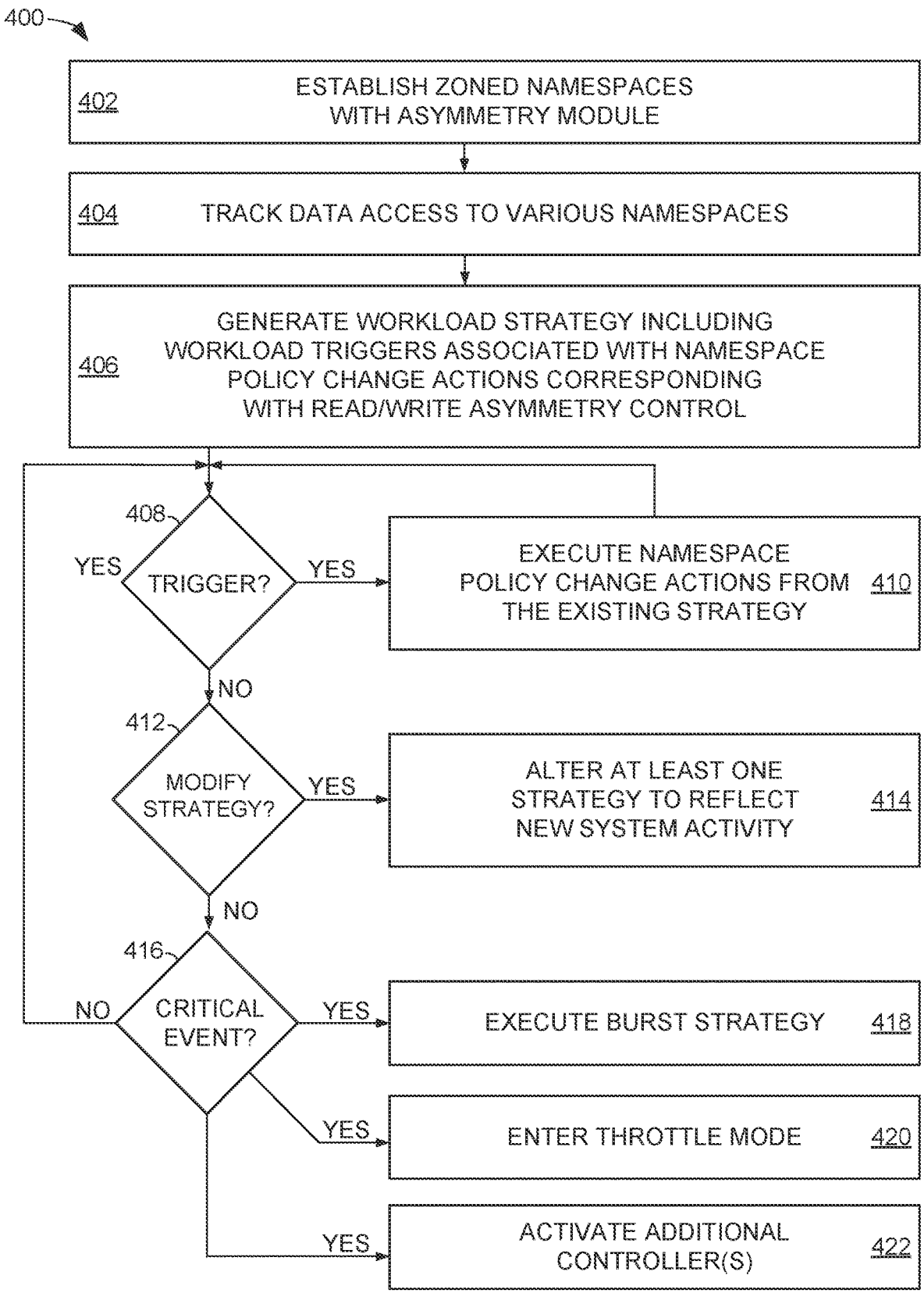
FIG. 19 is a flowchart of an example asymmetry compensation routine that can be carried out with some embodiments of FIGS. 1-18.

FIG. 19 depicts an example workload-based namespace asymmetry optimization routine 400 that can be carried out with the assorted embodiments of FIGS. 1-18. Initially, a data storage system is connected to a power module and initialized to service data access requests from hosts external to the memory, such as a third-party user. The asymmetry module establishes zoned namespaces in step 402 that can occupy any physical and logical data block addresses in one or more data storage devices, die of memory cells, and planes of memory cells. Activity to the zoned namespaces established in step 402 is subsequently tracked in step 404 by the asymmetry module to determine the capabilities, current performance, and operational configuration of the memory cells of the assorted namespaces. It is noted that the asymmetry module can track any number of different data access and memory behavior metrics over time.

The tracked data access activity and memory characteristics compiled by the asymmetry module from step 404 allows the asymmetry module to assign workload values to the respective namespaces that correspond with at least the volume of data accesses conducted on a namespace for a given length of time. An assigned namespace workload value may be more sophisticated, as directed by the asymmetry module, and can include a compilation of memory cell efficiency and/or reliability with availability. The ability to adapt the tracking of activity for a namespace and the generation of a workload value for the namespace allows the asymmetry module to conduct more, or less, rigorous processing and time to determine how much capability of a namespace is occupied by data access operations initiated by external hosts as well as background memory operations, such as garbage collection, memory refresh, and data mapping.

The generated workloads are monitored over time by the asymmetry module while a workload strategy is generated in step 406. The workload strategy establishes when various namespaces can benefit from reactive and/or proactive operational policy changes that provide read/write asymmetric manipulation and sets a workload trigger to prompt execution of at least one policy change action as prescribed by an asymmetry strategy. With one or more workload triggers set for each namespace while each namespace workload is compiled and tracked by the asymmetry module, decision 408 can determine if a workload trigger has been met, is imminently met, or is predicted to be met with a sufficiently high reliability. That is, the asymmetry module can associate workload values for the assorted namespaces of a data storage system with workload trigger thresholds that can be previously, currently, or likely met, which prompts step 410 to execute one or more namespace operational policy change that alters how data requests, data, memory, queues, channels, and/or buffers are operated in response to the workload trigger being met.

The execution of a namespace operational policy change can involve a diverse variety of actions, such as throttling data accesses, altering queued requests organization, activating multiple separate controllers, changing between sequential and random writes and/or reads, changing buffer locations for data, transitioning memory cells from multi-level to single level, indirect throttling of channels, direct throttling of channels, utilizing multiple different clock speeds for request execution, and/or queues with intentional delays, deactivation of hardware, re-classifying memory blocks, altering GCUs, and altering where and how frequently accessed data is stored. The reactive or proactive nature of the policy change actions in step 410 can be conducted any number of times as routine 400 returns to decision 408 to monitor if a workload trigger is reached.

While decision 408 monitors namespace workload over time for triggers, decision 412 can evaluate if an existing workload and/or namespace asymmetry strategy can be improved through modification. The evaluation of decision 412 can involve comparing recent workload activity with the activity predicted when the workload and power strategies were generated. Alternatively, decision 412 can involve comparing current memory performance with the performance capabilities when the workload and asymmetry strategies were generated. A determination that the current strategies are not optimal for the current and predicted namespace workloads and/or memory cell capabilities prompts step 414 to alter at least the asymmetry strategy to reflect the new system conditions. It is noted that step 414 may generate a completely new strategy, or simply modify one or more namespace operational policy change actions that correspond with altered data access performance characteristics.

An asymmetry module may also passively evaluate if an inadvertent and/or unscheduled critical event, such as power loss, hardware failure, or software failure, is imminent in decision 416. That is, the asymmetry module can determine that a critical event is imminent and utilizes the remaining stored energy in the highest ranked namespaces with the highest ranked hardware to conduct one or more critical data access operations. For instance, a burst strategy can be executed in step 418, pending data reads or data writes can be prioritized via throttling of queues, requests, and/or channels in step 420, or multiple additional controllers can be activated and assigned to complete pending data access requests in step 422.

Figure 20:
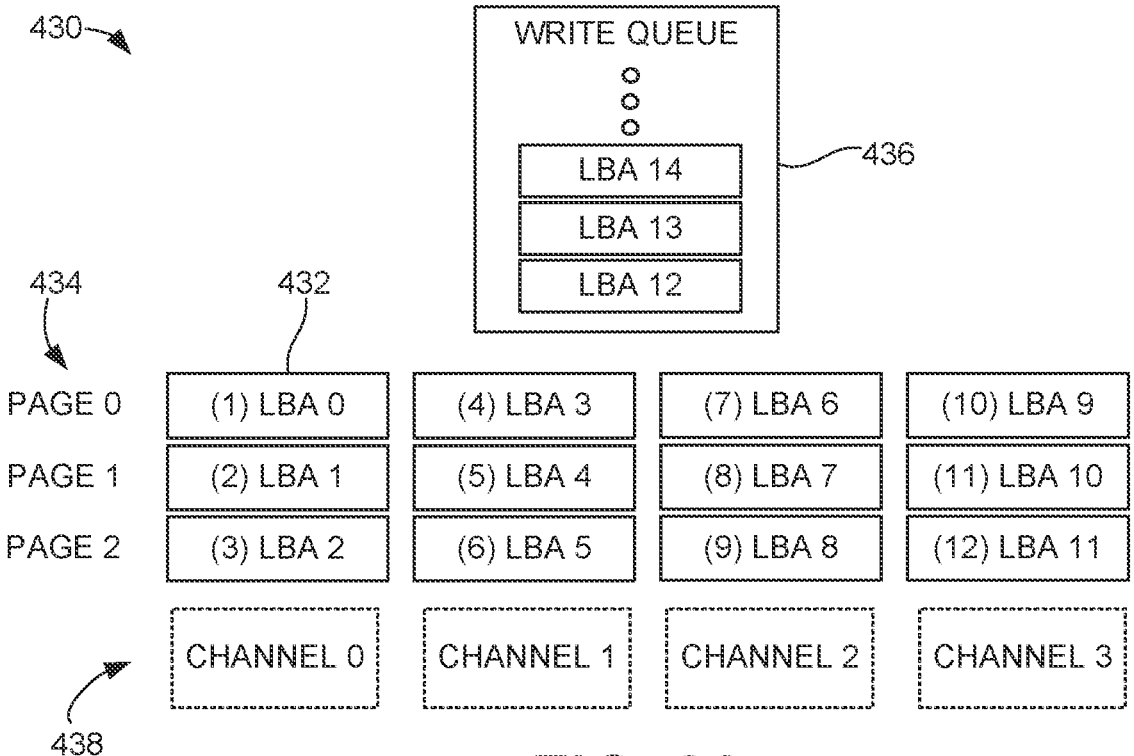
FIG. 20 depicts a block representation of portions of an example data storage system operated in accordance with various embodiments.

FIG. 20 depicts a block representation of portions of an example data storage system 430 where logical block addresses (LBAs) 432 are written sequentially to 3 consecutive pages 434 (denoted as Pages 0-2) of a 4-channel data storage device employing triple-level cell (TLC) memory cells. The smaller numbers in parentheses indicate the order in which the LBAs 432 were written. A write queue is denoted at 436. Channel buffers 0-3 are denoted at 438.

Since data from only a single page 434 can be read from a block at a time, if data is arranged in NAND as depicted in FIG. 20 and read sequentially, the read operation for LBA 1 must wait for the completion of LBA 0, and the read operation for LBA 2 must wait for the completion of both LBA 0 and LBA 1. This situation introduces large latencies in sequential read operations. The situation can be mitigated by writing the LBAs 432 at a point in time just before LBA 9 is added to the buffer 438 for channel 2. A sequential read of LBAs (starting with LBA 0) results in single read commands sent to channels 0 through 3. By the time the read command to read LBA 4 in channel 0 is sent, the read of LBA 0 from the channel is complete. In this way, the latencies previously observed are absent.

When data is written just before LBA 9 is added to the buffer for channel 2, the time required to add LBA 0 through LBA 8 to their respective channel buffers has already past. LBA 8 will have just been added to the 3-page buffer of channel 0 and a write operation was triggered for the device serviced by channel 0. After LBA 9 is added to the channel 1 buffer, the device connected to that channel will receive a write command. Continuing this flow, the NAND device connected to channel 2 will execute a write command followed soon after by channel 3 also executing a write command. The pattern is inactivity on all channels for an extended period as data for the first 2 pages is added to the channels followed by a rapid burst of activity where a write is triggered as each third page of data is added to a channel. This situation results in undesirable volatility in drive performance. Another undesirable feature of this approach is that any partially full buffers must be saved in the event of sudden power loss.

Figure 21:
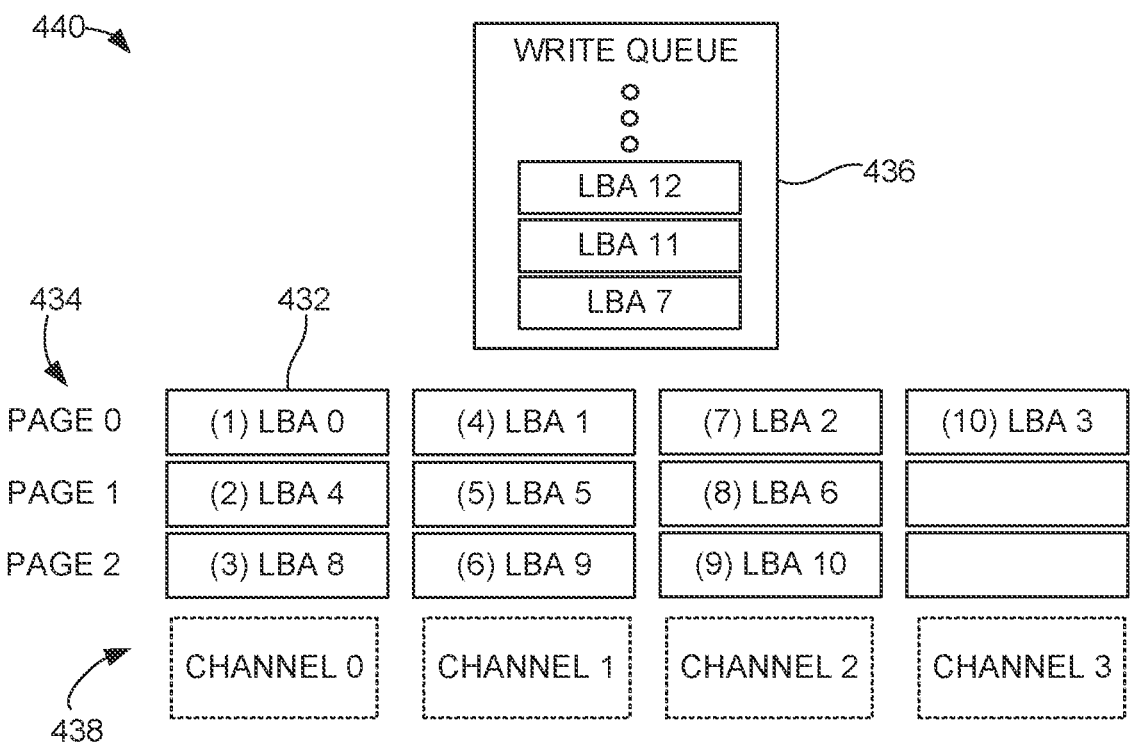
FIG. 21 depicts a block representation of portions of an example data storage system utilized in accordance with assorted embodiments.

The fundamentally new idea of various embodiments is to mitigate these undesirable behaviors by altering the order the data is transferred into the channel buffers 438. For instance, when the SSD firmware detects that sequential data is being written, after writing the first LBA of sequential data, such as the first LBA is LBA 0 written to channel 0, the firmware looks ahead in the write queue 436 for the next LBA to be received by the current channel 438, such as LBA 4 for channel 0, and moves it to the front of the queue. The "look ahead" is repeated until the buffer 438 for the current channel is full. Then, the data for all 3 pages 434 is written to memory. This process is repeated for subsequent channels 438. This situation is depicted in the block representation of portions of a data storage system 430 in FIG. 21.

Using this method, multi-page writes to solid-state memory cells occur at desirable regular intervals, and in the event of sudden power loss, only a single multi-page buffer 438 needs to be saved. In other words, LBAs are written first to channel 0 by "cherry picking" those LBAs which will maximize read performance. Then, the LBAs for channel 1 are cherry picked. It is noted that the smaller numbers in parentheses indicate the order in which the LBAs were written.

Through the various embodiments of a asymmetry module being employed in a data storage system, namespace configuration and operation can be intelligently manipulated based on encountered workload to provide optimal data access request completion consistency over time. By intelligently compiling namespace workloads and setting predetermined workload triggers, the asymmetry module can efficiently carry out prescribed actions that modify namespaces themselves and/or how data is handled flowing into, or out of, a namespace to control and maintain consistent overall completion times for data reads compared to data writes. The alteration of namespace operation in response to workloads tracked by the power module ensures that executed actions provide a practical balance between expended system processing resources and increased capability to satisfy namespace performance expectations with minimal processing and time resources being consumed.

What is claimed is:

1. A method comprising:
    arranging a plurality of memory cells located in different memory locations of one or more data storage devices into a plurality of logical namespaces, each logical namespace of the plurality of logical namespaces;
    generating a workload strategy with an asymmetry module connected to the plurality of logical namespaces, the workload strategy comprising at least one operational trigger;
    creating an asymmetry strategy and a channel strategy, proactively, with the asymmetry module in response to data access activity to the plurality of logical namespaces by the asymmetry module;
    predicting, with the asymmetry module, the at least one operational trigger being reached by at least one logical namespace of the plurality of logical namespaces;
    choosing a preexisting strategy to execute with the asymmetry module in response to the prediction of at least one operational trigger being met; and
    executing one or more operational alterations to an existing policy for a selected logical namespace of the plurality of namespaces as prescribed by the chosen strategy to reduce an asymmetry between a length of time a data read operation takes to complete for the selected logical namespace compared to a length of time a data write operation takes to complete for the selected logical namespace, the one or more operational alterations activating a previously deactivated controller to execute pending data access requests.

2. The method of claim 1, wherein the asymmetry module predicts the at least one operational trigger being met in response to passive monitoring of data access request satisfaction to the plurality of logical namespaces.

3. The method of claim 1, wherein the asymmetry module modifies an asymmetry strategy in response to a determination by the asymmetry module that the asymmetry strategy is not optimal for a current workload to a logical namespace of the plurality of logical namespaces.

4. The method of claim 1, wherein the one or more operational alteration changes from a sequential write to a random write to a logical namespace of the plurality of logical namespaces.

5. The method of claim 1, wherein the one or more operational alteration changes a sequence of queued data access requests to a logical namespace of the plurality of logical namespaces.

6. The method of claim 1, wherein the one or more operational alterations to the existing policy of the executing step comprises, during a write operation, accumulating input data blocks for storage to the selected logical namespace into a memory buffer in a first order, and subsequently transferring the input data blocks from the memory buffer to the memory cells of the selected logical namespace in a different, second order, wherein the second order is selected to facilitate subsequent retrieval of the input data blocks during a subsequent read operation in the first order, and wherein each of the memory cells of the selected logical namespace stores multiple bits.

7. The method of claim 6, wherein the first order comprises sequentially increasing logical block address (LBA) values assigned to the respective input data blocks, and wherein the second order comprises writing the input data blocks to the memory cells in groups having the LBA values separated by an interval count associated with a physical arrangement of the memory cells.

8. The method of claim 7, wherein the memory cells are flash memory cells configured to store multiple pages of data, each page arranged so that, at a conclusion of the write operation, the input data blocks in each page are arranged in the first order.

9. The method of claim 7, wherein the memory cells are flash memory cells configured to store multiple pages of data, each page arranged so that, at a conclusion of the write operation, the input data blocks in each page are arranged in the second order.

10. The method of claim 1, wherein the memory locations are arranged in a flash memory of a solid-state drive (SSD) having an SSD controller circuit, the asymmetry module incorporated into the SSD controller circuit which is configured to execute the generating, creating, predicting, choosing and executing steps.

11. A method comprising:
arranging a plurality of memory cells of a flash memory into a logical namespace, each of the memory cells configured to store multiple bits;
using an asymmetry module circuit to monitor data access activity between the logical namespace and a host; and
altering an existing policy for the logical namespace as prescribed by a chosen strategy to reduce an asymmetry between a length of time a data read operation takes to complete for the logical namespace compared to a length of time a data write operation takes to complete for the logical namespace by:
accumulating in a write queue input data blocks from the host for storage to the logical namespace during a write operation, the input data blocks accumulated in a sequential order comprising sequentially increasing logical block address (LBA) values; and
transferring selected input data blocks from the write queue to a selected channel buffer for transfer to selected memory cells of the logical namespace in a non-sequential order by transferring a first input data block from the write queue to the selected channel buffer, performing successive look ahead operations to advance each of a succession of additional input data blocks from the write queue to the selected channel buffer until the selected channel buffer is full, and then concurrently writing the first input data block and the additional input data blocks to the selected memory cells.

12. The method of claim 11, wherein the memory cells each store N bits of data and are arranged into rows so that each row of the memory cells stores N pages of the input data blocks, and wherein a total count of the first input data block and the additional input data blocks transferred to the selected channel buffer is equal to N.

13. The method of claim 12, wherein the LBA value of the first input data block is separated from the LBA value of a first of the succession of additional input data blocks by an amount corresponding to a total number of the input data blocks that can be stored across a page of the memory cells.

14. The method of claim 13, wherein the memory cells are flash memory cells configured to store multiple pages of data, each page arranged so that, at a conclusion of the write operation, the input data blocks in each page are arranged in the sequential order of the write queue.

15. The method of claim 12, wherein the memory cells are at least three-level cells (TLCs) so that N is equal to or greater than 3.

16. The method of claim 11, wherein the memory locations are arranged in a flash memory of a solid-state drive (SSD) having an SSD controller circuit, and wherein the asymmetry module circuit forms a portion of the SSD controller circuit.

17. An apparatus comprising:
a memory comprising a plurality of memory cells arranged into a logical namespace, each of the memory cells configured to store N bits of data and are arranged into rows so that each row of the memory cells stores N pages of the input data blocks; and
a controller circuit configured to monitor data access activity between the logical namespace and a host, and to alter an existing policy for the logical namespace as prescribed by a chosen strategy to reduce an asymmetry between a length of time a data read operation takes to complete for the logical namespace compared to a length of time a data write operation takes to complete for the logical namespace by changing a sequence order in which buffered input data blocks received from the host are metered from a memory buffer to the logical namespace during a write operation by:
accumulating, in a write queue, the input data blocks from the host for storage to the logical namespace during a write operation, the input data blocks accumulated in a sequential order comprising sequentially increasing logical block address (LBA) values; and
transferring selected input data blocks from the write queue to a selected channel buffer for transfer to selected memory cells of the logical namespace in a non-sequential order by transferring a first input data block from the write queue to the selected channel buffer, performing successive look ahead operations to advance each of a succession of additional input data blocks from the write queue to the selected channel buffer until the selected channel buffer is full, and then concurrently writing the first input data block and the additional input data blocks to the selected memory cells.

18. The apparatus of claim 17, characterized as a solid-state drive (SSD), wherein the memory cells comprise flash memory cells, and N is greater than or equal to 3.

19. The apparatus of claim 17, wherein the controller circuit further operates to detect a sequential write operation is underway responsive to detection of the sequential order of the LBA values of the data blocks in the write queue, and to perform the look ahead operations to selectively advance the input data blocks in the write queue in order to transfer the input data blocks to the memory buffer in the second order.

20. The apparatus of claim 17, wherein the memory cells are flash memory cells configured to store multiple pages of data, each page arranged so that, at a conclusion of the write operation, the input data blocks in each page are arranged in the sequential order of the write queue.

\* \* \* \* \*